(12) United States Patent
Vandergeest

(10) Patent No.: US 12,197,566 B2
(45) Date of Patent: *Jan. 14, 2025

(54) METHOD AND SYSTEM FOR PREVENTING AND DETECTING SECURITY THREATS

(71) Applicant: IRDETO B.V., Hoofddorp (NL)

(72) Inventor: Ron Vandergeest, Ottawa (CA)

(73) Assignee: IRDETO B.V., Hoofddorp (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/973,987

(22) Filed: Oct. 26, 2022

(65) Prior Publication Data

US 2023/0066210 A1 Mar. 2, 2023

Related U.S. Application Data

(63) Continuation of application No. 17/546,707, filed on Dec. 9, 2021, now Pat. No. 11,514,159, which is a continuation of application No. 17/319,193, filed on May 13, 2021, now abandoned, which is a continuation of application No. 17/178,383, filed on Feb. 18, 2021, now abandoned, which is a continuation of application No. 15/802,501, filed on Nov. 3, 2017, now abandoned, which is a
(Continued)

(51) Int. Cl.
*G06F 21/55* (2013.01)
*G06F 21/54* (2013.01)

(52) U.S. Cl.
CPC ............ *G06F 21/55* (2013.01); *G06F 21/54* (2013.01)

(58) Field of Classification Search
CPC .................. G06F 21/55; G06F 21/54
See application file for complete search history.

(56) References Cited

U.S. PATENT DOCUMENTS

| 5,499,357 A | 3/1996 | Sonty et al. |
| 5,899,987 A | 5/1999 | Yarom |

(Continued)

FOREIGN PATENT DOCUMENTS

| CN | 101470661 A | 7/2009 |
| CN | 104335220 B | 4/2018 |

(Continued)

OTHER PUBLICATIONS

Communication pursuant to Rules 70(2) and 70a(2) EPC received in corresponding European Application No. 12872928.2 dated Oct. 29, 2015, 1 page.
(Continued)

*Primary Examiner* — Aravind K Moorthy
(74) *Attorney, Agent, or Firm* — Rimon PC; Marc S. Kaufman

(57) ABSTRACT

A system and method is provided for implementing platform security on a consumer electronic device having an open development platform. The device is of the type which includes an abstraction layer operable between device hardware and application software. A secured software agent is provided for embedding within the abstraction layer forming the operating system. The secured software agent is configured to limit access to the abstraction layer by either blocking loadable kernel modules from loading, blocking writing to the system call table or blocking requests to attach debug utilities to certified applications or kernel components.

8 Claims, 14 Drawing Sheets

Related U.S. Application Data continuation of application No. 15/626,215, filed on Jun. 19, 2017, now Pat. No. 10,120,999, which is a continuation of application No. 14/389,364, filed as application No. PCT/CA2012/000298 on Mar. 30, 2012, now Pat. No. 9,703,950.

(56) References Cited

U.S. PATENT DOCUMENTS

| | | | |
|---|---|---|---|
| 6,058,393 A | 5/2000 | Meier et al. | |
| 6,105,059 A | 8/2000 | Al-Karmi et al. | |
| 6,151,639 A * | 11/2000 | Tucker | G06F 9/548 719/316 |
| 6,223,204 B1 * | 4/2001 | Tucker | G06F 9/52 710/200 |
| 6,263,456 B1 | 7/2001 | Boxall et al. | |
| 6,324,683 B1 | 11/2001 | Fuh et al. | |
| 6,327,652 B1 * | 12/2001 | England | G06F 9/4406 726/1 |
| 6,401,218 B1 * | 6/2002 | Linam | G06F 9/4406 714/36 |
| 6,741,258 B1 * | 5/2004 | Peck, Jr. | G06F 12/1027 345/568 |
| 6,799,236 B1 * | 9/2004 | Dice | G06F 9/3004 710/48 |
| 6,961,930 B1 * | 11/2005 | Waldspurger | G06F 11/3419 717/139 |
| 6,983,452 B1 | 1/2006 | Willems | |
| 7,178,062 B1 * | 2/2007 | Dice | G06F 9/524 718/107 |
| 7,392,398 B1 | 6/2008 | Shakkarwar | |
| 7,406,603 B1 * | 7/2008 | MacKay | G06F 21/55 726/16 |
| 7,428,636 B1 | 9/2008 | Waldspurger et al. | |
| 7,437,759 B1 | 10/2008 | Szor | |
| 7,480,740 B1 * | 1/2009 | Saxena | G06F 9/4411 719/321 |
| 7,587,724 B2 | 9/2009 | Yeap | |
| 7,617,534 B1 | 11/2009 | Szor et al. | |
| 7,649,904 B1 * | 1/2010 | Ghosh | H04L 45/02 370/428 |
| 7,665,139 B1 | 2/2010 | Szor et al. | |
| 7,765,393 B1 * | 7/2010 | Lee | G06F 11/1417 714/6.12 |
| 7,904,901 B1 | 3/2011 | Tormasov et al. | |
| 7,971,255 B1 | 6/2011 | Kc et al. | |
| 8,136,155 B2 | 3/2012 | Freund | |
| 8,156,378 B1 | 4/2012 | Suit | |
| 8,239,686 B1 * | 8/2012 | Hodzic | G06F 21/52 713/187 |
| 8,239,947 B1 | 8/2012 | Glick et al. | |
| 8,285,958 B1 | 10/2012 | Sallam | |
| 8,347,394 B1 | 1/2013 | Lee | |
| 8,352,721 B1 * | 1/2013 | Righi | G06F 9/4406 714/36 |
| 8,479,276 B1 | 7/2013 | Vaystikh et al. | |
| 8,479,292 B1 | 7/2013 | Linhardt | |
| 8,621,647 B1 | 12/2013 | Tinnes et al. | |
| 8,650,578 B1 | 2/2014 | Binotto et al. | |
| 8,677,118 B1 | 3/2014 | Liu et al. | |
| 8,683,052 B1 | 3/2014 | Brinskelle | |
| 8,782,434 B1 * | 7/2014 | Ghose | G06F 21/52 712/216 |
| 8,887,152 B1 | 11/2014 | Chen et al. | |
| 8,898,481 B1 * | 11/2014 | Osburn, III | H04L 67/12 713/192 |
| 8,918,907 B2 | 12/2014 | Lewis | |
| 9,027,143 B1 | 5/2015 | Agrawal et al. | |
| 9,112,898 B2 | 8/2015 | Perez | |
| 9,147,075 B1 * | 9/2015 | Litvin | H04L 63/06 |
| 9,177,153 B1 | 11/2015 | Perrig et al. | |
| 9,336,385 B1 | 5/2016 | Spencer et al. | |
| 9,424,430 B2 | 8/2016 | Rosenan | |
| 9,547,772 B2 * | 1/2017 | Durham | G06F 21/52 |
| 9,635,048 B2 | 4/2017 | Litva et al. | |
| 9,703,950 B2 | 7/2017 | Vandergeest | |
| 10,120,999 B2 * | 11/2018 | Vandergeest | G06F 21/55 |
| 10,242,179 B1 * | 3/2019 | Corbett | G06F 21/50 |
| 10,242,184 B2 | 3/2019 | Vandergeest | |
| 10,635,807 B2 | 4/2020 | Vandergeest | |
| 10,635,808 B2 | 4/2020 | Vandergeest | |
| 10,747,872 B1 | 8/2020 | Ha et al. | |
| 11,038,849 B1 * | 6/2021 | Alm | H04L 63/0428 |
| 11,228,421 B1 * | 1/2022 | Mesh | G06F 21/36 |
| 11,514,159 B2 * | 11/2022 | Vandergeest | G06F 21/54 |
| 2001/0042209 A1 | 11/2001 | Sato | |
| 2002/0038428 A1 | 3/2002 | Safa | |
| 2002/0062427 A1 | 5/2002 | Chauvel et al. | |
| 2002/0129281 A1 | 9/2002 | Hatfalvi et al. | |
| 2002/0144121 A1 * | 10/2002 | Ellison | G06F 21/55 713/176 |
| 2002/0152330 A1 | 10/2002 | Casper et al. | |
| 2002/0194495 A1 | 12/2002 | Gladstone et al. | |
| 2003/0014521 A1 | 1/2003 | Elson et al. | |
| 2003/0097557 A1 * | 5/2003 | Tarquini | G06F 21/55 713/153 |
| 2003/0196110 A1 * | 10/2003 | Lampson | H04L 63/0435 713/176 |
| 2003/0200440 A1 | 10/2003 | England et al. | |
| 2003/0200450 A1 | 10/2003 | England et al. | |
| 2004/0003271 A1 * | 1/2004 | Bourne | G06F 21/10 713/193 |
| 2004/0025015 A1 | 2/2004 | Satterlee et al. | |
| 2004/0054917 A1 | 3/2004 | Obrecht et al. | |
| 2004/0073837 A1 | 4/2004 | Mizuta et al. | |
| 2004/0098591 A1 | 5/2004 | Fahrny | |
| 2004/0117620 A1 | 6/2004 | Rothrock | |
| 2004/0148152 A1 | 7/2004 | Horikawa | |
| 2004/0153998 A1 * | 8/2004 | McGuire | G06F 9/545 717/128 |
| 2004/0154021 A1 * | 8/2004 | Sangili | G06F 9/4843 719/310 |
| 2004/0168173 A1 | 8/2004 | Cohen et al. | |
| 2004/0187029 A1 | 9/2004 | Ting | |
| 2004/0221269 A1 | 11/2004 | Ray et al. | |
| 2005/0005101 A1 | 1/2005 | Yenduri | |
| 2005/0005197 A1 * | 1/2005 | Chong | G06F 9/4406 714/36 |
| 2005/0010752 A1 | 1/2005 | Solsona et al. | |
| 2005/0010804 A1 | 1/2005 | Bruening et al. | |
| 2005/0060549 A1 * | 3/2005 | England | H04L 9/3263 713/175 |
| 2005/0066332 A1 * | 3/2005 | Durai | G06F 9/461 718/108 |
| 2005/0071824 A1 | 3/2005 | K. N et al. | |
| 2005/0076237 A1 | 4/2005 | Cohen et al. | |
| 2005/0108514 A1 | 5/2005 | Rothman et al. | |
| 2005/0120242 A1 | 6/2005 | Mayer et al. | |
| 2005/0165932 A1 | 7/2005 | Banerjee et al. | |
| 2005/0198080 A1 * | 9/2005 | Cai | G06F 11/3636 |
| 2005/0210287 A1 | 9/2005 | Paatero | |
| 2005/0216895 A1 | 9/2005 | Tran | |
| 2005/0268168 A1 | 12/2005 | Ishihara | |
| 2005/0289316 A1 * | 12/2005 | Durham | G06F 12/0284 711/170 |
| 2006/0047858 A1 * | 3/2006 | Atherton | G06F 9/4411 710/1 |
| 2006/0075462 A1 | 4/2006 | Golan et al. | |
| 2006/0075492 A1 | 4/2006 | Golan et al. | |
| 2006/0095895 A1 | 5/2006 | K. | |
| 2006/0101408 A1 | 5/2006 | Kotamarthi et al. | |
| 2006/0137016 A1 | 6/2006 | Margalit et al. | |
| 2006/0143708 A1 | 6/2006 | Garvey et al. | |
| 2006/0150256 A1 | 7/2006 | Fanton et al. | |
| 2006/0161821 A1 | 7/2006 | Oshins et al. | |
| 2006/0161896 A1 | 7/2006 | Hicks et al. | |
| 2006/0179483 A1 | 8/2006 | Rozas | |
| 2006/0184931 A1 * | 8/2006 | Rochette | G06F 8/61 717/136 |
| 2006/0190596 A1 | 8/2006 | Horikawa | |
| 2006/0206928 A1 | 9/2006 | Kamei et al. | |
| 2006/0212945 A1 | 9/2006 | Donlin et al. | |

(56) References Cited

U.S. PATENT DOCUMENTS

| | | | |
|---|---|---|---|
| 2006/0259487 A1 | 11/2006 | Havens et al. | |
| 2006/0259828 A1 | 11/2006 | Swoboda | |
| 2006/0265761 A1* | 11/2006 | Rochette | G06F 21/53 726/27 |
| 2006/0282734 A1 | 12/2006 | Milne et al. | |
| 2006/0282823 A1 | 12/2006 | Li et al. | |
| 2006/0291649 A1* | 12/2006 | Crandall | H04L 9/0662 380/46 |
| 2006/0294592 A1 | 12/2006 | Polyakov et al. | |
| 2007/0006314 A1 | 1/2007 | Costa et al. | |
| 2007/0016914 A1* | 1/2007 | Yeap | G06F 21/554 719/328 |
| 2007/0061800 A1* | 3/2007 | Cheng | G06F 8/65 717/170 |
| 2007/0074169 A1 | 3/2007 | Chess et al. | |
| 2007/0094507 A1* | 4/2007 | Rush | H04L 9/0897 713/176 |
| 2007/0094532 A1 | 4/2007 | Sengupta et al. | |
| 2007/0106981 A1 | 5/2007 | Bird et al. | |
| 2007/0136807 A1 | 6/2007 | Deliberato et al. | |
| 2007/0150956 A1* | 6/2007 | Sharma | G06F 21/54 726/24 |
| 2007/0162909 A1* | 7/2007 | Bahl | G06F 9/468 718/104 |
| 2007/0169043 A1 | 7/2007 | Violleau et al. | |
| 2007/0186112 A1 | 8/2007 | Perlin | |
| 2007/0192623 A1 | 8/2007 | Chandrasekaran | |
| 2007/0195800 A1 | 8/2007 | Yang et al. | |
| 2007/0220137 A1 | 9/2007 | Chess et al. | |
| 2007/0220337 A1 | 9/2007 | Itoh et al. | |
| 2007/0226487 A1 | 9/2007 | Li | |
| 2007/0271461 A1 | 11/2007 | Hardy et al. | |
| 2007/0277037 A1* | 11/2007 | Langer | H04L 9/3247 713/176 |
| 2007/0294699 A1* | 12/2007 | Bahl | G06F 21/52 718/104 |
| 2008/0015808 A1 | 1/2008 | Wilson et al. | |
| 2008/0016339 A1 | 1/2008 | Shukla | |
| 2008/0040587 A1 | 2/2008 | Burke et al. | |
| 2008/0040800 A1 | 2/2008 | Park | |
| 2008/0047010 A1 | 2/2008 | Marceau | |
| 2008/0055617 A1* | 3/2008 | Savagaonkar | G06F 12/1458 358/1.9 |
| 2008/0082772 A1 | 4/2008 | Savagaonkar et al. | |
| 2008/0082828 A1 | 4/2008 | Jennings et al. | |
| 2008/0127292 A1 | 5/2008 | Cooper et al. | |
| 2008/0127303 A1 | 5/2008 | Wrighton et al. | |
| 2008/0133929 A1 | 6/2008 | Gehrmann et al. | |
| 2008/0134321 A1* | 6/2008 | Rajagopal | H04L 9/3247 726/21 |
| 2008/0141251 A1 | 6/2008 | Arndt et al. | |
| 2008/0163375 A1 | 7/2008 | Savagaonkar et al. | |
| 2008/0165971 A1 | 7/2008 | de Cesare et al. | |
| 2008/0184335 A1 | 7/2008 | Zhang et al. | |
| 2008/0222160 A1* | 9/2008 | MacDonald | G06F 8/61 |
| 2008/0250217 A1 | 10/2008 | Kershaw et al. | |
| 2008/0270840 A1 | 10/2008 | Choi et al. | |
| 2008/0276314 A1* | 11/2008 | Wollnik | G06F 21/51 726/22 |
| 2008/0320347 A1 | 12/2008 | Cussonneau | G11C 29/16 714/E11.147 |
| 2009/0007100 A1 | 1/2009 | Field et al. | |
| 2009/0037887 A1 | 2/2009 | Chavan | |
| 2009/0055571 A1* | 2/2009 | Budko | G06F 21/53 718/1 |
| 2009/0063835 A1 | 3/2009 | Yao et al. | |
| 2009/0063865 A1* | 3/2009 | Berenbaum | H04L 9/3247 713/180 |
| 2009/0083547 A1 | 3/2009 | Shimizu et al. | |
| 2009/0113425 A1* | 4/2009 | Ports | G06F 9/4881 718/1 |
| 2009/0164427 A1* | 6/2009 | Shields | H04L 63/12 707/999.102 |
| 2009/0164517 A1* | 6/2009 | Shields | H04L 63/1425 |
| 2009/0172420 A1* | 7/2009 | Zayas | G06F 21/575 713/194 |
| 2009/0210688 A1 | 8/2009 | Kohiga | |
| 2009/0210888 A1* | 8/2009 | Lee | G06F 9/45558 719/321 |
| 2009/0221266 A1 | 9/2009 | Ohta et al. | |
| 2009/0228711 A1 | 9/2009 | Lim | |
| 2009/0249064 A1 | 10/2009 | De Atley et al. | |
| 2009/0249065 A1 | 10/2009 | De Atley et al. | |
| 2009/0254753 A1 | 10/2009 | De Atley et al. | |
| 2009/0271620 A1* | 10/2009 | Sudhakar | H04L 63/0823 713/164 |
| 2009/0271844 A1 | 10/2009 | Zhang et al. | |
| 2009/0288167 A1* | 11/2009 | Freericks | G06F 21/554 726/23 |
| 2009/0293057 A1 | 11/2009 | Arkin et al. | |
| 2009/0300307 A1 | 12/2009 | Carbone et al. | |
| 2009/0313695 A1 | 12/2009 | Bridges et al. | |
| 2010/0017879 A1 | 1/2010 | Kuegler et al. | |
| 2010/0017883 A1 | 1/2010 | Wang et al. | |
| 2010/0031012 A1* | 2/2010 | Rotondo | G06F 21/575 713/2 |
| 2010/0031360 A1 | 2/2010 | Seshadri et al. | |
| 2010/0057865 A1 | 3/2010 | Chan et al. | |
| 2010/0076744 A1* | 3/2010 | Gehr | G06F 9/45504 703/24 |
| 2010/0077385 A1 | 3/2010 | Flores Assad et al. | |
| 2010/0095370 A1 | 4/2010 | Lee et al. | |
| 2010/0100955 A1 | 4/2010 | Young et al. | |
| 2010/0122313 A1 | 5/2010 | Tvgi | |
| 2010/0125916 A1 | 5/2010 | Choi et al. | |
| 2010/0169633 A1 | 7/2010 | Zimmer et al. | |
| 2010/0174920 A1* | 7/2010 | Buckingham | G06F 21/575 713/193 |
| 2010/0178896 A1 | 7/2010 | Terrero et al. | |
| 2010/0185876 A1 | 7/2010 | Kim | |
| 2010/0229173 A1 | 9/2010 | Subrahmanyam | G06F 9/4887 718/1 |
| 2010/0257599 A1 | 10/2010 | Gleichauf | |
| 2010/0257608 A1 | 10/2010 | Jeong et al. | |
| 2010/0287562 A1 | 11/2010 | Jazdzewski | |
| 2010/0299467 A1 | 11/2010 | Yoon | |
| 2010/0318793 A1 | 12/2010 | Manoharan et al. | |
| 2010/0332927 A1 | 12/2010 | Kurts et al. | |
| 2011/0022840 A1 | 1/2011 | Stefan et al. | |
| 2011/0023115 A1 | 1/2011 | Wright | |
| 2011/0066787 A1* | 3/2011 | Markey | G06F 21/572 713/193 |
| 2011/0066835 A1 | 3/2011 | Kothari et al. | |
| 2011/0087872 A1* | 4/2011 | Shah | H04L 9/30 713/2 |
| 2011/0099423 A1* | 4/2011 | Chen | G06F 11/2289 714/25 |
| 2011/0113406 A1 | 5/2011 | Flemming et al. | |
| 2011/0138174 A1* | 6/2011 | Aciicmez | G06F 21/6272 713/165 |
| 2011/0145598 A1 | 6/2011 | Smith et al. | |
| 2011/0179495 A1 | 7/2011 | Maetz et al. | |
| 2011/0209219 A1 | 8/2011 | Zeitlin et al. | |
| 2011/0219447 A1 | 9/2011 | Horovitz et al. | |
| 2011/0228926 A1 | 9/2011 | Shumow et al. | |
| 2011/0239298 A1 | 9/2011 | Burtscher | |
| 2011/0239306 A1 | 9/2011 | Avni et al. | |
| 2011/0246767 A1 | 10/2011 | Chaturvedi et al. | |
| 2011/0246782 A1 | 10/2011 | MacKay et al. | |
| 2011/0252404 A1 | 10/2011 | Park et al. | |
| 2011/0258608 A1 | 10/2011 | Li et al. | |
| 2011/0258618 A1 | 10/2011 | Capuozzo et al. | |
| 2011/0265180 A1* | 10/2011 | Unagami | G06F 21/6281 726/22 |
| 2011/0271270 A1 | 11/2011 | Bowen | |
| 2012/0011350 A1 | 1/2012 | Peckham et al. | |
| 2012/0011503 A1 | 1/2012 | Filali-Adib et al. | |
| 2012/0017213 A1* | 1/2012 | Hunt | G06F 21/53 718/100 |
| 2012/0030731 A1 | 2/2012 | Bhargava et al. | |
| 2012/0030758 A1 | 2/2012 | Van Den Berg et al. | |

(56) References Cited

U.S. PATENT DOCUMENTS

| | | | |
|---|---|---|---|
| 2012/0042376 A1* | 2/2012 | Dolgunov | G06F 9/4406 |
| | | | 726/19 |
| 2012/0047576 A1 | 2/2012 | Do et al. | |
| 2012/0047580 A1 | 2/2012 | Smith et al. | |
| 2012/0054868 A1 | 3/2012 | Ramalingam | |
| 2012/0054875 A1 | 3/2012 | Antill | |
| 2012/0054877 A1 | 3/2012 | Rosu | |
| 2012/0060217 A1 | 3/2012 | Sallam | |
| 2012/0090022 A1* | 4/2012 | Walkes | G06F 21/85 |
| | | | 726/19 |
| 2012/0096142 A1 | 4/2012 | Suit | |
| 2012/0096264 A1 | 4/2012 | Traversat et al. | |
| 2012/0101952 A1 | 4/2012 | Raleigh et al. | |
| 2012/0131555 A1 | 5/2012 | Hossain et al. | |
| 2012/0137375 A1 | 5/2012 | Ramachandran et al. | |
| 2012/0151184 A1 | 6/2012 | Wilkerson et al. | |
| 2012/0158395 A1 | 6/2012 | Hughes et al. | |
| 2012/0158396 A1 | 6/2012 | Douceur et al. | |
| 2012/0159630 A1 | 6/2012 | Wang | |
| 2012/0166623 A1 | 6/2012 | Suit | |
| 2012/0167056 A1 | 6/2012 | Brunswig et al. | |
| 2012/0216281 A1 | 8/2012 | Uner et al. | |
| 2012/0222120 A1 | 8/2012 | Rim et al. | |
| 2012/0254982 A1 | 10/2012 | Sallam | |
| 2012/0255015 A1 | 10/2012 | Sahita et al. | |
| 2012/0255031 A1 | 10/2012 | Sallam | |
| 2012/0260082 A1* | 10/2012 | Bobzin | G06F 21/572 |
| | | | 713/100 |
| 2012/0310393 A1 | 12/2012 | Stewart et al. | |
| 2012/0311341 A1* | 12/2012 | Paris | G06F 21/57 |
| | | | 726/4 |
| 2012/0317443 A1 | 12/2012 | Chandran et al. | |
| 2012/0317548 A1 | 12/2012 | Olsa et al. | |
| 2012/0321087 A1* | 12/2012 | Fleischman | H04L 9/3213 |
| | | | 380/279 |
| 2012/0331348 A1 | 12/2012 | La Fever et al. | |
| 2013/0019305 A1 | 1/2013 | Berenbaum et al. | |
| 2013/0047037 A1 | 2/2013 | Moyer | |
| 2013/0054962 A1 | 2/2013 | Chawla et al. | |
| 2013/0055347 A1 | 2/2013 | Chawla et al. | |
| 2013/0067236 A1* | 3/2013 | Russo | G06F 21/73 |
| | | | 713/189 |
| 2013/0067563 A1 | 3/2013 | Park et al. | |
| 2013/0074160 A1 | 3/2013 | Nakamura et al. | |
| 2013/0097517 A1 | 4/2013 | Reiss et al. | |
| 2013/0097655 A1 | 4/2013 | Vaidyanathan et al. | |
| 2013/0104188 A1* | 4/2013 | Western | G06F 21/57 |
| | | | 726/1 |
| 2013/0125210 A1 | 5/2013 | Felt et al. | |
| 2013/0159779 A1 | 6/2013 | Mickens | |
| 2013/0159977 A1 | 6/2013 | Crosetto et al. | |
| 2013/0160126 A1 | 6/2013 | Kapoor et al. | |
| 2013/0160131 A1 | 6/2013 | Madou et al. | |
| 2013/0173898 A1 | 7/2013 | Berg et al. | |
| 2013/0191622 A1* | 7/2013 | Sasaki | G06F 9/4401 |
| | | | 713/2 |
| 2013/0219363 A1 | 8/2013 | Wu et al. | |
| 2013/0239166 A1 | 9/2013 | MacLeod et al. | |
| 2013/0275980 A1 | 10/2013 | Datta | |
| 2013/0283368 A1 | 10/2013 | Waddington et al. | |
| 2013/0305006 A1 | 11/2013 | Altman et al. | |
| 2013/0312098 A1 | 11/2013 | Kapoor et al. | |
| 2013/0312099 A1 | 11/2013 | Edwards et al. | |
| 2013/0332698 A1 | 12/2013 | Yu | |
| 2013/0340074 A1 | 12/2013 | Ayachitula et al. | |
| 2014/0006760 A1 | 1/2014 | Nemiroff et al. | |
| 2014/0082373 A1 | 3/2014 | Colnot | |
| 2014/0082751 A1 | 3/2014 | Vipat et al. | |
| 2014/0122902 A1 | 5/2014 | Isozaki et al. | |
| 2014/0181526 A1 | 6/2014 | Alrabady | |
| 2014/0189256 A1 | 7/2014 | Kranich et al. | |
| 2014/0189778 A1 | 7/2014 | Li et al. | |
| 2014/0215202 A1* | 7/2014 | Paris | G06F 21/572 |
| | | | 713/100 |
| 2014/0230012 A1 | 8/2014 | Ahn | |
| 2014/0244991 A1* | 8/2014 | Akdemir | G06F 8/66 |
| | | | 713/2 |
| 2014/0250291 A1* | 9/2014 | Adams | G06F 21/575 |
| | | | 713/2 |
| 2014/0298468 A1 | 10/2014 | Yamamura et al. | |
| 2014/0304520 A1* | 10/2014 | Bobzin | G06F 21/572 |
| | | | 713/187 |
| 2015/0012980 A1* | 1/2015 | Mikolajczyk | G06F 21/602 |
| | | | 726/5 |
| 2015/0019856 A1* | 1/2015 | Kim | G06F 21/575 |
| | | | 713/1 |
| 2015/0040224 A1 | 2/2015 | Litva et al. | |
| 2015/0052616 A1 | 2/2015 | Hutchison et al. | |
| 2015/0089238 A1* | 3/2015 | Lewis | H04L 9/3236 |
| | | | 713/183 |
| 2015/0089645 A1 | 3/2015 | Vandergeest | |
| 2015/0113618 A1* | 4/2015 | Sinha | G06F 21/44 |
| | | | 726/6 |
| 2015/0113640 A1 | 4/2015 | Krten et al. | |
| 2015/0121068 A1* | 4/2015 | Lindemann | H04L 63/0823 |
| | | | 713/169 |
| 2015/0135283 A1* | 5/2015 | Tofighbakhsh | H04L 49/109 |
| | | | 726/5 |
| 2015/0268947 A1* | 9/2015 | Ionescu | G06F 21/566 |
| | | | 709/224 |
| 2015/0277929 A1 | 10/2015 | Paul et al. | |
| 2015/0339195 A1* | 11/2015 | Yang | G06F 11/1417 |
| | | | 714/6.12 |
| 2015/0363187 A1* | 12/2015 | Dhar | G06F 9/4401 |
| | | | 713/2 |
| 2015/0381658 A1* | 12/2015 | Poornachandran | H04W 12/64 |
| | | | 726/1 |
| 2016/0004866 A1 | 1/2016 | Lin et al. | |
| 2016/0048688 A1 | 2/2016 | Flynn et al. | |
| 2016/0087801 A1* | 3/2016 | Jones | G06F 21/575 |
| | | | 713/176 |
| 2016/0098555 A1 | 4/2016 | Mersh et al. | |
| 2016/0139995 A1* | 5/2016 | Takami | G06F 11/1441 |
| | | | 714/23 |
| 2016/0294559 A1* | 10/2016 | Dabak | G06F 21/602 |
| 2017/0006020 A1* | 1/2017 | Falodiya | G06F 8/61 |
| 2017/0083701 A1 | 3/2017 | Tajalli et al. | |
| 2017/0116427 A1* | 4/2017 | Major | G06F 21/57 |
| 2017/0169216 A1 | 6/2017 | Boehm et al. | |
| 2017/0177870 A1* | 6/2017 | Hildebrand | G06F 21/57 |
| 2017/0177873 A1* | 6/2017 | Raghuram | G06F 21/53 |
| 2017/0228235 A1* | 8/2017 | Choi | G06F 9/4401 |
| 2017/0255775 A1* | 9/2017 | Sorresso | G06F 21/575 |
| 2017/0286665 A1* | 10/2017 | Miranda | H04L 63/0823 |
| 2017/0300309 A1* | 10/2017 | Berger | H04W 4/021 |
| 2017/0324562 A1* | 11/2017 | Laffey | H04L 9/0891 |
| 2017/0372064 A1 | 12/2017 | Vandergeest | |
| 2018/0032734 A1* | 2/2018 | Gunti | G06F 21/575 |
| 2018/0060570 A1 | 3/2018 | Vandergeest | |
| 2018/0060571 A1 | 3/2018 | Vandergeest | |
| 2018/0068117 A1 | 3/2018 | Vandergeest | |
| 2018/0068118 A1 | 3/2018 | Vandergeest | |
| 2018/0082083 A1* | 3/2018 | Smith | G06F 21/575 |
| 2018/0157840 A1* | 6/2018 | Crowley | G06F 21/575 |
| 2018/0198629 A1* | 7/2018 | Deymonnaz | H04L 9/30 |
| 2018/0239929 A1* | 8/2018 | Shell | G06F 21/51 |
| 2018/0247059 A1 | 8/2018 | Nara et al. | |
| 2018/0260559 A1 | 9/2018 | Jarrous et al. | |
| 2018/0268146 A1* | 9/2018 | Suryanarayana | G06F 21/445 |
| 2018/0276387 A1* | 9/2018 | Liu | G06F 21/575 |
| 2018/0314831 A1* | 11/2018 | Liu | H04L 9/3247 |
| 2018/0322278 A1 | 11/2018 | Hershman et al. | |
| 2018/0330095 A1 | 11/2018 | Packer Ali et al. | |
| 2018/0357385 A1* | 12/2018 | LaPorte | A61L 2/08 |
| 2019/0079746 A1* | 3/2019 | Thomas | G06F 21/572 |
| 2019/0123905 A1 | 4/2019 | Kirner et al. | |
| 2019/0130111 A1* | 5/2019 | Shiose | H04L 9/0894 |
| 2019/0163911 A1 | 5/2019 | Kliewer et al. | |
| 2019/0213317 A1* | 7/2019 | Fujikawa | H04L 63/0823 |
| 2019/0278914 A1 | 9/2019 | Le Roy et al. | |
| 2019/0312734 A1* | 10/2019 | Wentz | H04L 9/0877 |
| 2019/0349204 A1* | 11/2019 | Enke | H04L 9/3247 |

(56) References Cited

U.S. PATENT DOCUMENTS

| | | | | |
|---|---|---|---|---|
| 2019/0362066 | A1* | 11/2019 | Rajeev | G06F 21/62 |
| 2019/0363894 | A1* | 11/2019 | Kumar Ujjwal | H04L 9/3268 |
| 2019/0370019 | A1 | 12/2019 | Tsirkin | |
| 2019/0386977 | A1* | 12/2019 | Shah | H04W 60/00 |
| 2020/0036519 | A1* | 1/2020 | Bitauld | H04L 9/0897 |
| 2020/0082093 | A1* | 3/2020 | Shimizu | G06F 9/445 |
| 2020/0117797 | A1 | 4/2020 | Muthalakuhy | |
| 2020/0322423 | A1* | 10/2020 | Sheth | H04L 67/104 |
| 2021/0006417 | A1 | 1/2021 | Pala | |
| 2021/0011660 | A1* | 1/2021 | Ono | G06F 3/0619 |
| 2021/0056207 | A1* | 2/2021 | Tiwari | G06F 8/65 |
| 2021/0089327 | A1* | 3/2021 | Vasilik | G06F 8/65 |
| 2021/0103661 | A1 | 4/2021 | Wu | |
| 2021/0124578 | A1* | 4/2021 | Yamazaki | G11C 11/4094 |
| 2021/0149681 | A1* | 5/2021 | Alon | G06F 21/572 |
| 2021/0232681 | A1 | 7/2021 | Tsirkin | |
| 2021/0232691 | A1* | 7/2021 | Bishop | H04L 9/3236 |
| 2021/0312057 | A1* | 10/2021 | Kloth | G06F 3/0623 |
| 2021/0389958 | A1* | 12/2021 | Choi | G06F 21/572 |

FOREIGN PATENT DOCUMENTS

| | | |
|---|---|---|
| EP | 2831787 A4 | 11/2015 |
| WO | 2013142948 A1 | 10/2013 |

OTHER PUBLICATIONS

Communication pursuant to Article 94(3) EPC received in corresponding European Applicaiton No. 12872928.2 dated May 2, 2018, 4 pages.
First Office Action received in corresponding Chinese Application No. 201280073522.3 dated Jul. 27, 2016, 14 pages including English Translation).
Second Office Action received in corresponding Chinese Application No. 201280073522.3 dated Apr. 24, 2017, 8 pages (including English Translation).
Third Office Action received in corresponding Chinese Application No. 201280073522.3 dated Sep. 12, 2017, 7 pages (including English Translation).
Notification to Grant Patent Right for Invention received in corresponding Chinese Application No. 201280073522.3 : lated Jan. 8, 2018, 3 pages (including English Translation).
Non-Final Rejection mailed on Jul. 18, 2018, in corresponding U.S. Appl. No. 15/802,501, 36 pages.
Non-Final Rejection mailed on Jul. 18, 2018, in corresponding U.S. Appl. No. 15/803,804, 25 pages.
International Search Report and Written Opinion cited in corresponding International Application No. PCT/CA2012/000298 dated Dec. 27, 2012, 10 pages.
Walsh, "Features/SELinuxDenyPtrace", http://fedoraprojecl.org/wiki/Features/SELinuxDenyPtrace, Jan. 23, 2012, 3 Pages.
Jones, "Anatomy of Security-Enhanced Linux (SELinux)" IBM, IBM.com/developerWorks/, Apr. 29, 2008, pp. 1-10.
Ghosh, "A Report on Kernel Loadable Module", hllp://web.arehive.org/web/20080724110347/hllp://kghosh.yoll.nel/, captures on Jul. 24, 2008, 36 pages.
Wright et al., "Linux Security Modules: General Security Support for the Linux Kernel", Proceedings of the Foundations of Intrusion Tolerant Systems (OASIS '03), pp. 213-226, 2003.
Reiter, "Exploiting Loadable Kernel Modules" http://www.ouah.org/reiterlkm.htm, captures on Jan. 15, 2010, 7 pages.
Jones, "Anatomy of Linux loadable kernel modules", A 2.6 kernel perspective IBM, IBM.com/developerWorks/, Jul. 16, 2008, pp. 1-11.
Extended European Search Report cited in corresponding European Application No. 12872928.2 dated Oct. 12, 2015, 4 pages.
Anonymous: "Security-Enhanced Linux—Wikipedia, the free Encyclopedia", Mar. 22, 2012, Retrieved from the internet: https://en.wikipedia.org/w/index.php?title=Security-Enhanced_Linux&oldid=483369008, 6 pages.
Non-Final Rejection mailed on Nov. 23, 2015, in corresponding U.S. Appl. No. 14/389,364, 22 pages.
Final Rejection mailed on Jun. 20, 2016, in corresponding U.S. Appl. No. 14/389,364, 24 pages.
Notice of Allowance mailed on Mar. 8, 2017, in corresponding U.S. Appl. No. 14/389,364, 9 pages.
International Preliminary report on Patentability issued in corresponding International Application No. PCT/CA2012/000298 dated Oct. 9, 2014, 7 pages.
Non-Final Rejection mailed on Feb. 5, 2018, in corresponding U.S. Appl. No. 15/626,215, 45 pages.

* cited by examiner

METHOD AND SYSTEM FOR PREVENTING AND DETECTING SECURITY THREATS

RELATED APPLICATIONS

This application is a continuation application of Ser. No. 17/546,707, filed Dec. 9, 2021, which is a continuation application of Ser. No. 17/319,193, filed May 13, 2021, which is a continuation application of Ser. No. 17/178,383, filed Feb. 18, 2021, which is a continuation application of Ser. No. 15/802,501, filed Nov. 3, 2017, which is a continuation application of Ser. No. 15/626,215, filed Jun. 19, 2017, which is a continuation application of Ser. No. 14/389,364, filed Sep. 29, 2014, which is a national stage application of PCT/CA2012/000298, filed Mar. 30, 2012, the disclosures of which are incorporated herein by reference in their entirety.

FIELD

The present disclosure relates generally to preventing and detecting security threats to an operating system and certified applications operating on an electronic device.

BACKGROUND

Devices such as mobile phones, tablets, games consoles, set top boxes, televisions, personal navigation devices, and other consumer electronics devices (or simply "devices") are typically purchased by consumers from retail distribution channels (e.g., consumer electronics stores) or may be sold to or leased to consumers by service providers (or simply "operators")—e.g., mobile network operators, broadcast television network providers, or Internet video providers. Traditionally, such devices were closed devices or embedded devices that were based on proprietary hardware and operating systems and that did not support third party software applications. However, such devices have increasingly become open devices. It should be understood that "open" in the context of this background discussion can include varying degrees including, but not limited to, standard hardware (such as a system on a chip based on an Intel or ARM processor), open source operating systems and software, open or published APIs to enable third party applications development, and/or freely modifiable programming.

Such devices may include open source operating systems, including those such as Linux (an open source Unix-type operating system originally created by Linus Torvaids with the assistance of developers around the world) or Android (an open source mobile operating system based on a modified version of the Linux kernel and marketed by Google, Inc. of Mountain View, California).

Attacks on closed or embedded devices, in the form of unauthorized use and access, have taken place for many years. However, such hacking of embedded devices has been a specialized and highly technical process that required a specialized combination of hardware and software skills. In contrast, open devices have hardware and operating systems that are well understood by many developers and hackers. Accordingly, this trend to open devices greatly increases the potential number of hackers with knowledge and expertise that renders such open devices much more susceptible to attack. Such open devices also support the capability for third party application developers to develop applications for those device (e.g., open API's) and hence such devices also increasingly support the capability for consumers to download, install, and execute third-party software applications (or simply "applications") on such devices. Such applications are not developed by the operator or the original equipment manufacturer (or simply "OEM") of the device. In terms of software design, such applications may be developed using a script language (e.g., JavaScript) that is executed within an interpreter or virtual machine or native code that runs directly on the device (e.g., a C or C++ program).

The capability for consumers to purchase or lease and to download and install third-party software applications on devices may be provided by the OEM (e.g. Apple Inc.), an operator, or a company that is unaffiliated with the OEM or operator typically via an Internet-based retail interface—e.g., the iTunes Store or the Android Market (software-based online digital media stores operated by Apple Inc. and Google Inc., respectively). Internet-based retail interface provides a system by which the third-party application developer (or simply "developer") shares part of the revenue from sales of an application with the Internet-based retail interface provider. The trend to enable consumers to download and install such third-party applications on devices also increases the potential security concerns for consumers, operators, developers and OEM's beyond those that would normally be associated with an embedded device.

Third-party software sold to the consumer may contain malicious software known as malware (e.g., worms, viruses, Trojans, rootkits, and backdoors). Such malware may cause a breach of consumer privacy—e.g., malware on a mobile phone might monitor a user's position via the GPS capabilities of the mobile phone and transmit such positional data to a remote server. Malware may also cause identity theft or fraudulent use of the device or related services—e.g., malware on a mobile phone could automatically dial services which add charges to a user's mobile phone subscription. Malware may also cause network stability problems for operators—e.g., malware on mobile phones could inappropriately use network capabilities such as SMS or mobile voice calling to create a denial of service attack against a mobile network operator's network impacting the network service quality or availability.

Additional security concerns include unauthorized applications. Providers of Internet-based retail interfaces may "certify" applications or application developers to ensure that malware is not present in the applications sold through their Internet-based retail interfaces. This serves to provide some level of protection against the malware concerns and to prevent applications from otherwise compromising the security of the device and/or device network (i.e., mobile network). If this certification process can be circumvented or is not exhaustive, then consumers may unknowingly download malware onto their devices from an unauthorized Internet-based retail interface or other Internet web site. If this certification process can be circumvented or is not adequate to detect potential malware then consumers may unknowingly download malware onto their devices from an Internet-based retail interface.

A rootkit is a particular type of malware that enables continued privileged access to a computer while actively hiding its presence from administrators by subverting standard operating system functionality or other applications. An attack lily rootkit malware consists of several stages and uses various components: a vulnerability or capability exists in the system that is the subject of an exploit to take advantage of it and do something not foreseen or intended. The intent of the exploit is typically to install a payload such as additional malware components that can continue to operate behind the scenes, receiving and executing new instructions from a remote server. Typical payload activities include surreptitious uploading of private user information, sending spam or launching distributed denial-of-service (DDOS) attacks.

Many rootkits make use of loadable kernel modules to modify the running operating system kernel to execute the payload. A loadable kernel module contains code to dynamically extend the running kernel of an operating system without loading all desired functionality in memory at boot time.

Rootkit detection is difficult because a rootkit may be able to subvert the software that is intended to find it. Known detection methods include using an alternative, trusted operating system; behavioral-based methods; signature scanning; difference scanning; and memory dump analysis. Removal of a rootkit can be complicated or practically impossible, especially in cases where the rootkit resides in the operating system kernel where reinstallation of the operating system may be the only available solution to the problem. When dealing with firmware rootkits, removal may require hardware replacement, or specialized equipment.

Existing approaches to platform security (i.e., security intended to address one or more of the security problems noted above) typically involve one or more of the following methods further grouped and described herein below.

"Operating system security" is a security method whereby one or more functions or capabilities including process isolation, access control, private application programming interfaces (APIs), and application certification/signing, and application licensing services may be provided by an operating system. Such functions and capabilities are further described as follows.

"Process isolation" may be supported by the operating system (or a hypervisor installed beneath the operating system) to ensure that each application and parts of the system runs in its own process and dedicated memory space such that, by default, no application has the capability to perform any operation that could adversely affect another application, the operating system (OS), or the consumer. Each application process can be considered to be running in its own operating environment often referred to as its own "sandbox." However, to develop applications that are useful to users, most applications must be able to access operating system services (e.g., on a mobile phone OS, send short message service (SMS) text messages, get user location, record phone calls, take pictures, or the like) that are not supported within the basic sandbox. This limits the effectiveness of process isolation or the "sandbox" as the application must access operating system services outside the sandbox, which increases the probability that the application may perform operations that negatively affect other applications, the OS, or the consumer.

"Access control" involves the ability to address the requirement for applications to use OS services or resources outside the sandbox or for native applications, OS services or resources that could enable a native application to adversely affect other applications, the consumer or a network. Here, the OS includes access control functionality that makes decisions about whether to grant such access to a requesting application. This access control functionality may be combined with the concept of permissions. For example in the Android OS from Google Inc., application developers must declare the permissions required by their applications in an associated manifest file to enable the application to perform any operation that might adversely affect other applications, the OS, or the consumer. Access control decisions may also be based on the privileges inherently granted to an application (e.g., user application or root access in the Linux OS). One of the problems associated with permissions is related to the question of who or what grants permissions to an application and whether the grantor understands the implications of such approval (e.g., in the Android OS case it is, the consumer that grants such permissions). Another problem is that such permissions may be modified by malware or an attacker following such grant of permissions by the consumer or the certifying authority. Some operating systems have access control frameworks that enable different access control models to be implemented (e.g., Linux Security Module (LSM)). LSM enables different access control models and functions, to be implemented as loadable kernel modules.

"Private APIs" are another mechanism to limit the ability of applications to access operating system services or resources that may adversely affect platform security. Here, although many system API's may be open or public, the OEM may limit access to certain operating system services by maintaining the secrecy of API's required to access such services from applications developers. This is normally coupled with an application certification process to ensure that applications submitted for certification do not attempt to call such private API's.

"Application certification/signing" involves various existing application certification processes in current use that ensure applications do not perform malicious operations and/or access private API's. These processes generally include static verification (e.g., scanning the object code prior to execution) of the application (e.g., to verify that private API's are not called by the application) and dynamic verification (e.g. to verify the "stability" of the application during execution). If the Application passes the certification process it is then digitally signed by the certifying authority (which may also be the Internet-based retail interface provider) in a form that can later be verified. One of the problems with current application certification schemes is that a comprehensive verification is not readily automated and, hence, is not exhaustive. Because of this, a malicious operation could be embedded in the application in such a manner that it will only execute at a pre-specified time following the application certification/signing process. Accordingly, such malicious operation can avoid detection during the verification process. Another problem with application certification is the sheer number of applications that may have to be certified by an Internet-based retail interface provider. For example, it is estimated that the Apple Inc.'s Internet-based retail interface for providing mobile software applications for their iPhone™ brand smartphone has over 300,000 applications and that there are 10,000 new applications submitted to Apple Inc. each week. This makes it cost-prohibitive to perform exhaustive verification of applications before certification. Another problem is that a hacker could modify or replace the root of trust in the OS (i.e., a digital certificate and software) used to verify the integrity of the application against the signature generated by the Internet-based retail interface provider such that the application can be modified following application certification/signing, such that the permissions associated with the application can be modified to allow a hostile third party to load an unauthorized or pirated application onto the device by a consumer.

"Application licensing services" involves protection against application piracy whereby the system provides a license service. For example, the Android OS provides a licensing service that lets an application developer enforce licensing policies for paid applications. However, these types of application licensing services can be readily circumvented by hackers by modifying the application to extract such license verification checks.

In addition to the problems noted in each of the above functions and capabilities found within platform security, there is a problem that is common to process isolation, access control, and application licensing services whereby the portions of the OS that support such security functions can be subverted or bypassed by modifying portions of the operating system that perform such functions. To prevent such changes to the OS security functions or other OS functions, a further method of utilizing a "secure boot loader" is often implemented in devices.

A "secure boot loader" (or "secure boot" for short) is used to ensure that only the intended boot software and OS kernel are loaded onto the device. Here, the authentication compares the applicable software against a signature generated by the device OEM. The authentication or integrity verification of the boot software and the OS kernel occur only during device start-up such that this mechanism can be circumvented by dynamic attacks occurring during the boot process. Once the secure boot loader has been bypassed, the OS can be modified to bypass other security functions that may be present in the OS. These dynamic attacks can be highly automated so that they are accessible by consumers that do not otherwise have the technical skills to independently implement such attacks (i.e., jailbreaking techniques). Moreover, there is no way to restore device security for devices already deployed in the field once the secure boot process has been compromised.

In addition to the problems noted above relating to platform security, there is a problem that is common to process isolation, access control, application licensing services, virtual machines, and secure boot loaders that relates to the ability to recover from an attack. Generally, once an attack has occurred there is no mechanism in place to recover platform security for devices that have been sold or licensed or otherwise distributed to consumers. We refer to this as "static security" because the assumption inherent in the design of such platform security is that the platform security mechanisms put in place will resist any and all attacks during the useful lifespan of the device. Static security is often attacked and such attacks are then "packaged" into automated attacks that can be implemented by the average consumer (e.g., the known jailbreak attack on the iPhone™ developed by Apple™).

"Virus detection and intrusion prevention software" is another security method used to detect malware and mitigate any damage that such malware may cause. To date, nearly every solution to detect malware on devices, such as mobile phones, has relied upon the same "signature"-based mechanisms that personal computer (PC) anti-virus solutions have used for years. The term "signature" here does not involve a digital signature, but rather a set of attributes by which a specific piece of malware can be identified—e.g., an attribute such as being of a specific length and having a specific sequence of bytes at a certain location within it. However, these signatures are only understood once the malware has been deployed, meaning the malware may have already caused damage. Additionally, these signature-based types of solutions must be constantly updated and must be able to detect 10's of thousands of malware signatures. These alone cannot be relied upon as the only means of detecting and preventing damage from malware on devices. Additionally, anti-virus software itself can be modified or disabled by malware to prevent such detection.

"Virtual machines" is yet another security method used to apply platform security. Virtual machines, such as the Java™ virtual machine (JVM), are designed to allow the safe execution of applications obtained from potentially untrusted sources. The JVM accepts a form of computer intermediate language commonly referred to as Java™ bytecode which is a programming language conceptually representing the instruction set of a stack-oriented, capability architecture from Oracle Corporation of Redwood Shores, California. Java™ applications run in a restricted sandbox which is designed to protect the user from misbehaving code or malware. This comes with performance limitations and limitations in terms of the functionality—e.g., applications are prevented from accessing operating system functions and resources that are deemed to be "hazardous".

Each of the aforementioned security methods form part of a static platform security functionality 100 as shown in prior art FIG. 1. Additionally, secure bootstrap loading 110 as shown in FIG. 1 is well known, for example within U.S. Pat. No. 6,185,678 issued to Arbaugh et al. on Feb. 6, 2001, and not further described herein.

It is, therefore, desirable to provide a security mechanism that overcomes some of the problems associated with previous methods of preventing unauthorized use of a device and digital assets on that device and the limitations of static platform security.

SUMMARY

According to a first aspect, there is provided a system, and related method, for prevention and detection of security threats that comprises device hardware including at least one CPU and memory, an abstraction layer stored in the memory that is operable between the device hardware and application software, and a secured software agent embedded with the abstraction layer, the secured software agent configured to limit access to the abstraction layer. In some aspects, the abstraction layer is an open operating system, such as Linux, and in some aspects, the secured software agent is compliant with a Linux Security Module.

According to a related aspect, the secured software agent is configured to prevent loading software code that is used to extend the functionality of the abstraction layer. In some aspects this software code is a loadable kernel module. In another aspect, the secured software agent is configured to validate the loadable kernel module, and preventing loading the loadable kernel module is based on a successful validation. In some aspects, the validation is based on information unique to the loadable kernel module stored in a secure store accessed by the agent. In some aspects, the secured software agent can be incorporated into a kernel utility that loads loadable kernel modules, that in some other aspects, includes the Unix based kernel utility insmod.

According to another related aspect, the secured software agent is configured to block over-writing pointers to system calls to the abstraction layer. In some aspects, the secured software agent blocks writing a system call table that contains pointers to system calls. In some aspects, the secured software agent blocks writing to a memory range containing the system call table.

According to yet another related aspect, the secured software agent is configured to block a debug utility request. In some aspects, the secured software agent is configured to determine whether the debug utility request attempts to attach to any one of a certified application and a component of the abstraction layer, and the secured software agent blocking the debug utility request is based on the determination. In some aspects, the debug utility includes a process tracing system call to the abstraction layer. In a further aspect, the debug utility is ptrace or the Android Debug Bridge daemon.

Other aspects and features will become apparent to those ordinarily skilled in the art upon review of the following description of specific embodiments in conjunction with the accompanying figures.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment, and in which.

DETAILED DESCRIPTION

Though applicable to any mobile phones, games consoles, tablets, set top boxes, televisions or other consumer electronic devices, the embodiments described herein will be in terms of such devices that use an open OS such as, but not limited to, the Linux or Android™ OS. In particular, the preferred embodiment will be shown and described relative to the Android™ OS for purposes of illustration only and should not be construed as limiting the intended scope of the present disclosure. Indeed, some of advantages described in terms of preventing installation of rootkits or preventing probing the OS for vulnerabilities are universally applicable to any device OS with particular usefulness to any open device as a result of the inherently greater security risks associated with such open devices.

Figure 2A:
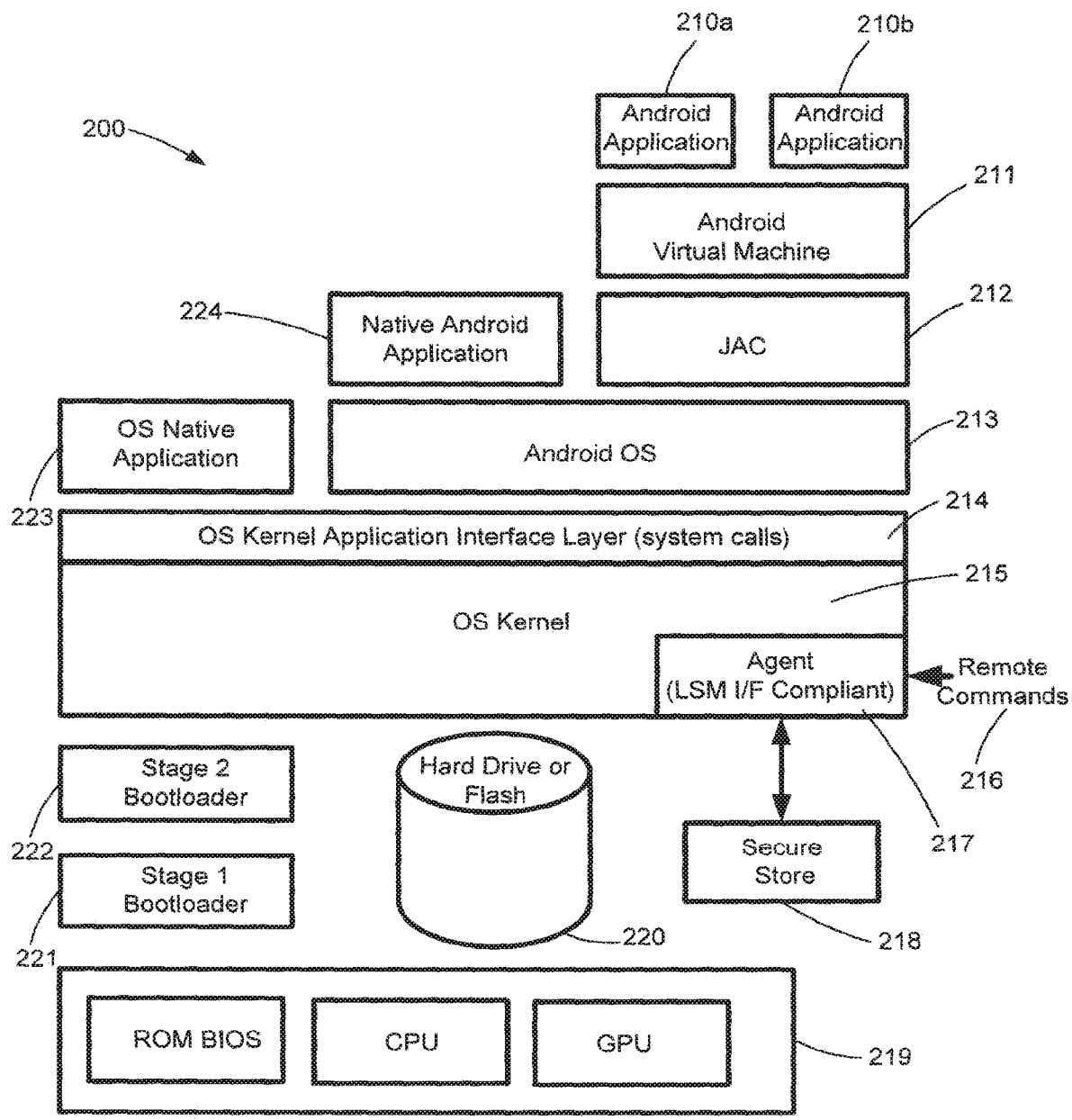
FIG. 2A is a layer schematic showing an embodiment as applied to an Android OS.
Figure 2B:
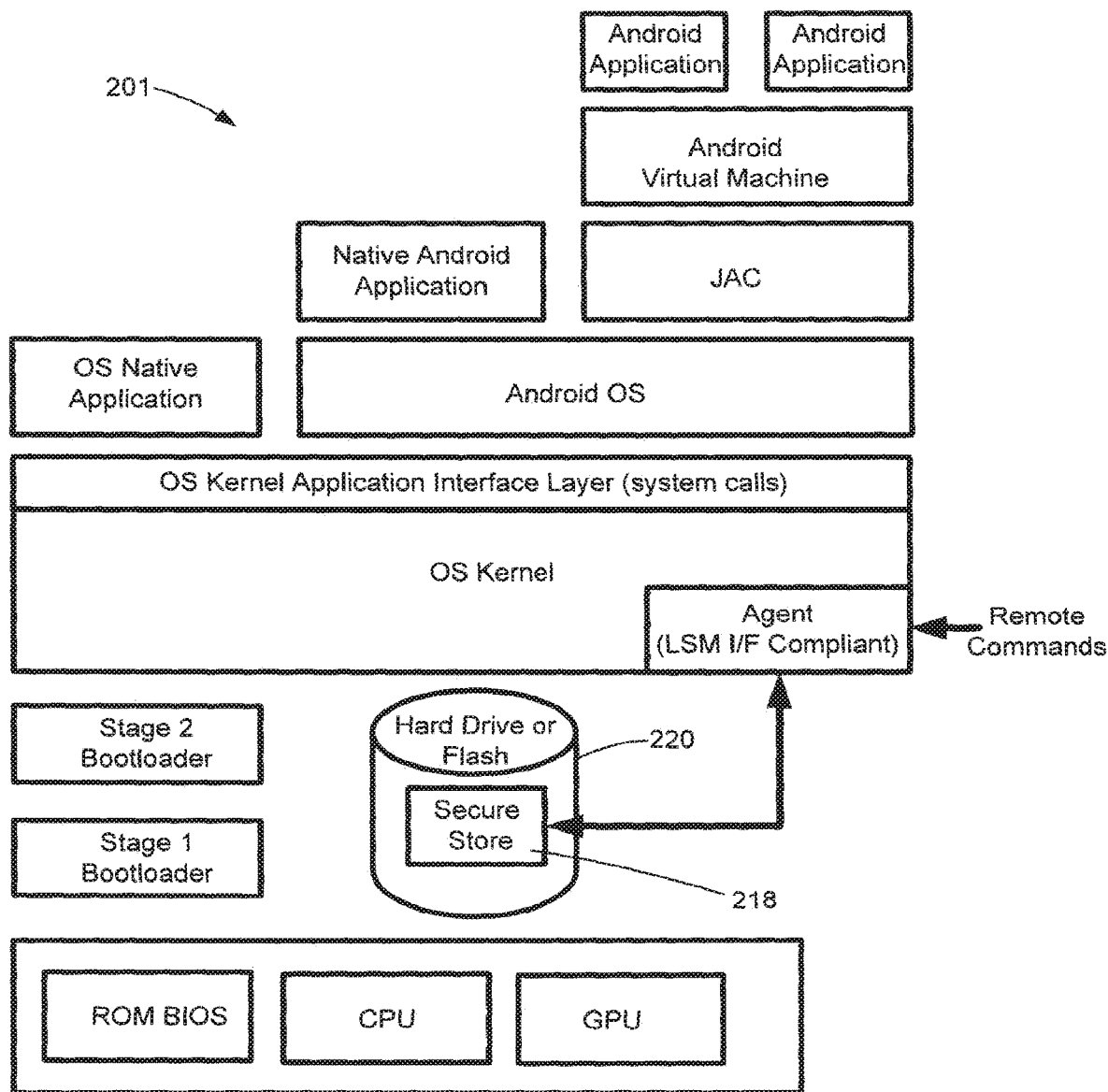
FIG. 2B is a layer schematic showing another embodiment as applied to an Android OS.
Figure 2C:
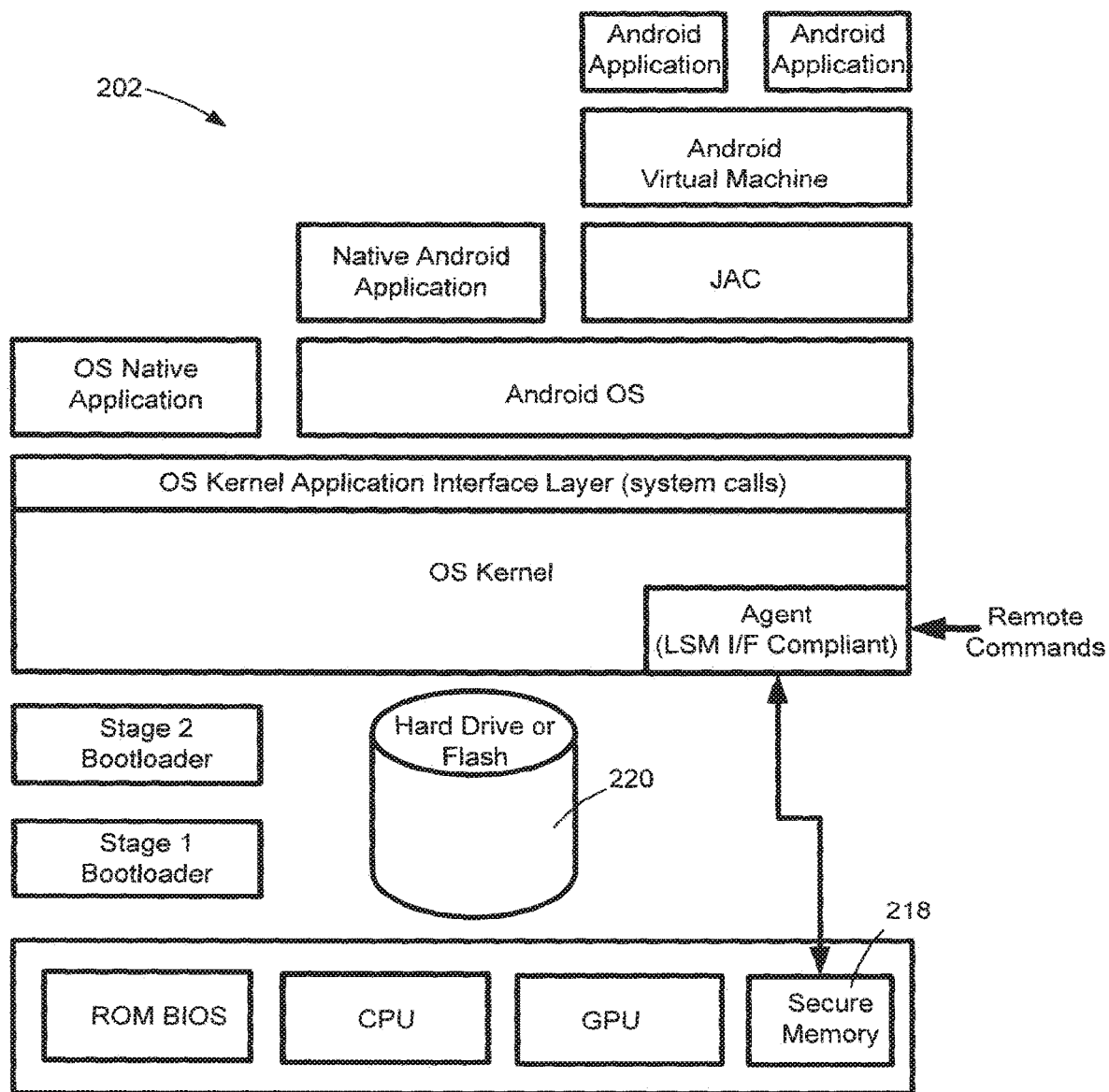
FIG. 2C is a layer schematic showing yet another embodiment as applied to an. Android OS.

With reference to FIGS. 2A-C, an overall layer schematic 200 of an Android™ OS environment showing the basic architecture of the layered execution stack. A base layer 219 involves typical system on a chip (SOC) components including a central processing unit (CPU), graphics processing unit (GPU), and memory (read only memory (ROM)) within which the basic input/output system (BIOS) resides. The uppermost layer illustrated in FIGS. 2A-C is a device application shown here as one or more Android™ applications 210a, 210b. Intervening layers include the various known software and hardware elements including a hard disk drive (HDD) storage device or flash memory 220, the OS kernel 215 and OS kernel application interface layer 214 which manages system calls between the OS native applications 223 and the Android™ OS 213. In accordance with the illustrated embodiment, the layered execution stack further includes a Java™ access control (JAC) layer 212 between the Android™ OS 213 and the virtual machine (VM) layer 211 (i.e., Dalvik, which is the Android™ VM that forms an integral part of the Android™ OS). The VM layer serves to convert the given application into a compact executable form (i.e., the ".dex" format in terms of Android™ applications) suitable for execution in a known manner on the given device. The JAC layer 212 serves to provide secure access control by authenticating communication between the machine executable code of the VM layer 211 and a security agent (or simply "agent") 217. Such access control functionality may include any suitable known mechanism that provides a bridge between scripted apps and the native agent to allow the agent to verify the integrity of the scripted application thereby extending the range of "applications" to scripted applications. It should further be understood that if all applications are assumed to be native applications 224, then the JAC layer 212 would not be required.

Figure 1:
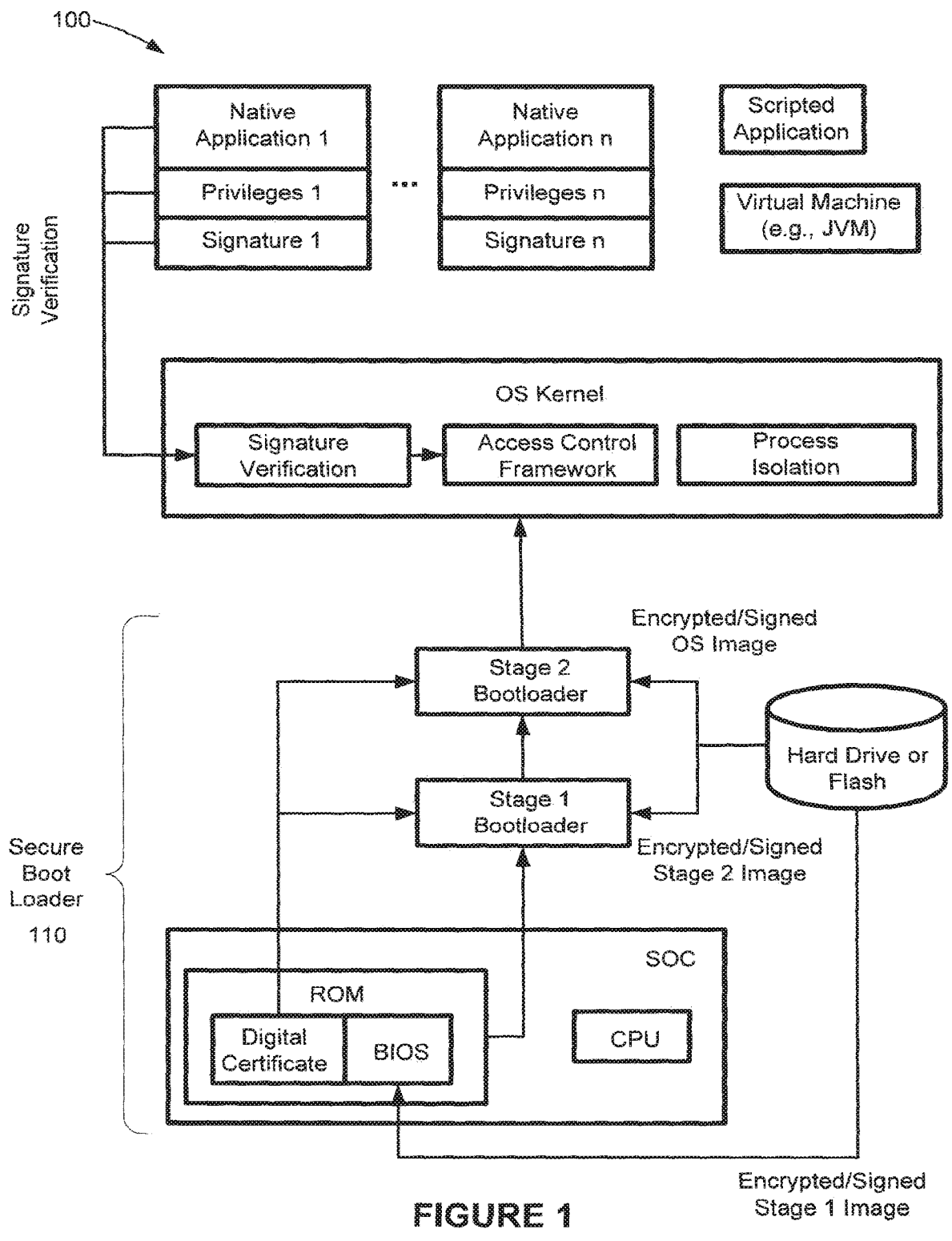
FIG. 1 is a schematic representing prior art static platform security functionality.

It should be understood that some embodiments can be implemented in conjunction with known static platform security functionality 100 as shown in FIG. 1. More specifically, some embodiments can include existing OS system security functions, such as process isolation, by ensuring that the portions of the operating system that perform such functions are not modified during the boot process or during run time. As well, the embodiment complements existing secure boot loader functions (Stage 1 Bootloader 221 and Stage 2 Bootloader 222 as shown in FIGS. 2A-C) by verifying that the correct secure boot loader path was followed and by dynamically verifying the integrity of the OS and boot loader. It should be understood that such secure boot loader only functions as such during start-up.

The agent 217 is embedded in the OS kernel 215, and is preferably implemented to use the Linux Security Module interface (LSM I/F). The agent 217 inserts "hooks" (upcalls to the agent 217) at points in the kernel where a user-level system call from an application is about to result in access to an important internal kernel object such as inodes and task control blocks. LSM is not further discussed herein as it is a known framework (which is applicable to Android™ as well as Linux distributions) that allows the Linux kernel to support a variety of computer security models without favoring any single security implementation. In order to render the agent 217 resistant to tampering, modification, and reverse engineering attacks, the agent 217 is itself protected using known software protection techniques such as, but not limited to, those described in more detail in U.S. Pat. Nos. 6,594,761, 6,779,114, 6,842,862, and 7,506,177 each issued to Chow et al. which illustrate examples of such tamper resistance that may be usable in conjunction with the disclosed embodiments.

It should be understood that the agent 217 forms an integral and un-detachable part of the OS kernel 215 without which the device OS 213 and/or the applications 210a, 210b, 224 will cease to function correctly. One example of the functions of the agent 217 is to monitor the integrity of both the OS 213 and the applications 210a, 210b, 224 loaded onto the device, and to detect any breaches of the OS 213 or secure boot 221, 222. The agent 217 maintains and has sole access to a secured data store 218 within which the agent 217 keeps information relevant for the agent's performance of kernel resource access control, integrity verification, application licensing and application resource access control. While the secure store 218 is shown in FIG. 2A as being a separate component of the inventive system, it should be understood that the secure store 218 may exist within the hard drive or flash 220 as seen in alternative embodiment 201 of FIG. 2B. Still further, the secure store 218 may exist as a secure memory within the system on a chip base layer 219 as seen in further alternative embodiment 202 in FIG. 2C.

In terms of kernel resource access control, the agent is configured to control application access to OS kernel resources and data. The access control decisions made by the agent 217 are based on, but not limited to, factors such as; OS kernel integrity, application integrity, application context, and the privileges granted by any given trusted root authority. An access control decision based on OS kernel integrity determines whether the kernel has been modified, been replaced, been added to, or had portions removed in an unauthorized manner. The access control decision will also determine whether the secure boot process even occurred. If the OS kernel has been modified, replaced, added to or portions removed or the secure boot process cannot be positively verified, this determination would serve to invalidate many of the assumptions that the agent 217 or an application 224 or a secure application such as a media player would normally operate under. An access control decision based upon application integrity determines whether the application that is attempting to access OS kernel resources has been modified in any way (e.g., to insert malware into the application or by other malware) or whether the privileges associated with that application been modified (e.g., to give it privileges to access system resources that were not authorized by the certifying authority).

An access control decision based upon application context determines whether a given application is functioning in some manner outside the context of that application. Thus, the agent 217 can make context sensitive access control decisions. An access control decision based upon any given trusted root authority determines application permissions relative to the authority. In other words, some embodiments may support multiple application signing authorities such that the agent 217 may grant an application signed by a highly trusted authority a greater degree of latitude in terms of access to system resources than may be granted to an application signed by a less trusted authority or an application that was not certified at all.

In terms of the agent's performance of integrity verification, the agent is configured to dynamically monitor (e.g., in memory while the software is running) the integrity of the kernel, the secure boot components, the agent itself, and all protected applications and unprotected applications to determine if any of these items have been modified in any way at any time during the execution of the given application(s) (e.g., dynamic tampering which might be implemented using a debugger).

In terms of the agent's performance of application resource control, the agent 217 is configured to control access to application resources which may include, for example, a portion of the application that has been encrypted by the agent 217, or data files that are required by the application to execute (e.g., game resource files), or data to control execution of applications. Such access control decisions are based on, factors such as, but not limited to, the presence of valid license data or the confirmation of the identity of the device or consumer, either of which are designed to protect applications from piracy.

The agent 217 can be embodied in software and generated by diverse code portion combinations with a fixed interface. Creation of such variations in code portions can be accomplished according to known methods, or combinations of such methods, including those described in U.S. Pat. Nos. 6,594,761, 6,779,114, 6,842,862, or 7,506,177 each issued to Chow et al. or any other suitable known method. Such variations can be termed "diverse agents" or "updated agents." Diverse agents are those which have the same functionality, F, but that are structurally and semantically diverse. The objective of generating and deploying diverse agents is to prevent an automated attack—i.e., an attack developed by a sophisticated attacker that can be sufficiently automated that it is simple to use by an average consumer and that would be applicable to each and every agent deployed in some installed base of devices. Such diverse agents may be deployed across different instantiations of a device, different types of devices, devices sold in different geographic regions or by different operators, etc.

Updated agents are those whereby if an agent, A1, with functionality set F1, is deployed in the field and is compromised or attacked in some way, it is desirable to fix such vulnerability. This may be accomplished by generating an agent, A2, that incorporates the functionality F1 but which also incorporates a new functionality designed to prevent the attack on A1. This incremental functionality, F2, is such that the functionality of A2 is now F1+F2. By applying diversity capabilities to A2, it is more difficult for an attacker to isolate the software functions in A2 (e.g., through differential analysis) which implement the new functionality F2. Updated agents provide a mechanism to address attacks on devices or agents that are already deployed in the field. Such updated agents could be downloaded by consumers, pushed to the device via a software update mechanism or pulled to the device by the existing agent. Where such updates occur, it should be understood that they are accomplished by configuring the agent software for updates upon identification and analysis of any attempted or actual successful attack by a security threat. Therefore, updates to the agent 217 can be issued for attacks that are "in development" as hackers will often post information of attacks that are in development or known vulnerabilities but which have not yet succeeded in reaching the attackers objectives.

Figure 3:
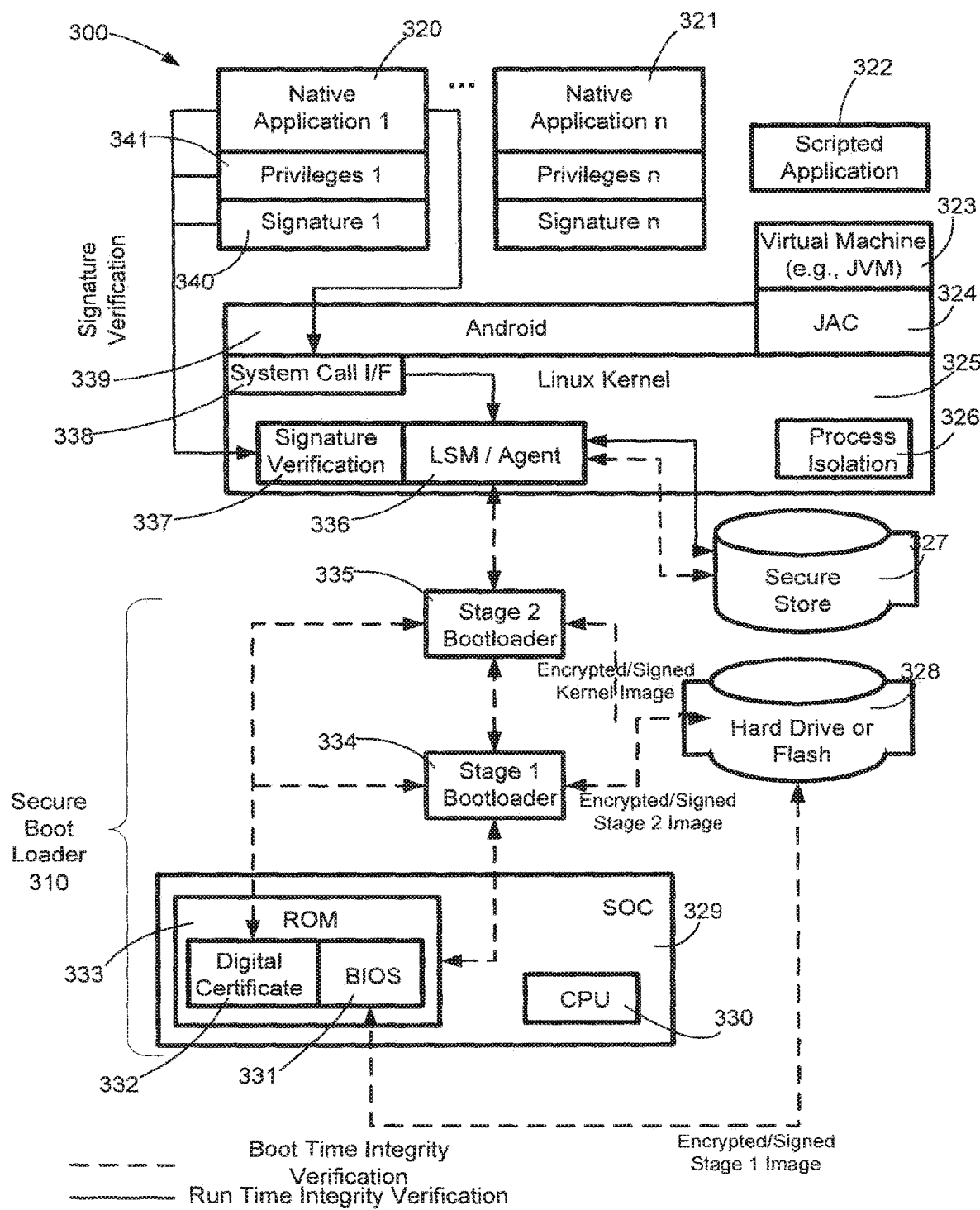
FIG. 3 is a schematic showing certain aspects of dynamic platform security functionality in accordance with the accordance with the embodiment of FIG. 2A.

With regard to FIG. 3, a more detailed schematic 300 of the dynamic platform security functionality is shown in accordance with the generalized stack architecture illustrated in FIG. 2. Here, it can be seen clearly, when compared with prior art FIG. 1, how the illustrated embodiment compliments and can be implemented in conjunction with the known static platform security functionality. As in the previous FIGS. 2A-2C, the base layer includes typical SOC 329 components including a CPU 330 and ROM 333 within which BIOS 331 resides.

In terms of the operations shown in FIG. 3, there is a typical secure boot loader sequence 310 provided as shown. It should be understood that some embodiments could leverage existing secure boot technology. It should equally be understood that the boot sequence may equally apply to 1 stage or the many stages there-after. Typically there are 2 boot loading stages 334, 335 in a system as shown in FIG. 3. Generally speaking, bottom up validation of secure boot components occurs as the first component validates the second component before transferring execution control to the next component. This boot time integrity verification is shown by way of dotted lines. Here, the first stage occurs upon device reset, where ROM code is hard wired to the device reset address. The ROM (or boot ROM) 333 loads the next boot stage 334 after verifying that the next boot stage is the intended boot stage. This verification or authentication is performed by computing a digital signature from the HDD or flash memory 328. If the digital signature matches the pre-computed value (as encapsulated in the digital certificate 332 as shown), then the OS boot loader 335 will be loaded into main memory and executed. If the signature does not match the pre-computed value at any stage, execution control will not transfer to the next stage and the device will fail to boot. When the OS boot loader 335 has execution control, the OS boot loader performs 335 a similar operation of validating the OS image from the HDD or flash memory 328. Again, if the computed signature matches the expected pre-computed signature, it will load into memory the OS image and transfer control to the OS image (i.e., the Linux kernel 325 operating in the Android™ OS 339 as shown). The OS image will then initialize, and during this process the agent 336 will also be initialized. While the agent 336 is included in the OS image which is digitally signed, it should be understood that the agent 336 may be updated. This is because signatures are broken down into logical module separation and each module has its own signatures that are checked during the secure boot process. Therefore, any module may be replaced though the signature must be valid and trusted cryptographically with a digital signing private key.

With continued reference to FIG. 3, the OS kernel 325 is shown as the Linux kernel modified for the Android™ OS 339. The OS kernel 325 can be implemented using a Linux Security Module ("LSM"). As mentioned above, LSM is a framework that allows the Linux kernel 325 to support a variety of computer security models while avoiding favoring any single security implementation. LSM provides hooks at every point in the Linux kernel 325 where a user-level system call is about to result in access to an important internal kernel object. LSM can be used to implement a wide range of security functions (e.g., Mandatory Access Control (MAC), On Access Virus Checking).

The agent 336 can also be configured to include integrity verification (or simply "IV"). The IV function that is embedded in the agent 336 enables the agent 336 to perform static integrity verification (e.g., on HDD or on flash memory) and dynamic integrity verification (e.g., in random access memory (RAM)). IV is implemented by computing a hash value for an application or system component and then comparing that to a known good value for the hash function. If the calculated value is the same as the stored known good value, then the agent assumes that the component has not been modified by an attacker. However, if the calculated value is different than the stored known good value, then the agent assumes that the component has been modified and can no longer be trusted to perform the functionality that it was intended to perform or that it should no longer have the same privileges that were originally assigned to it.

As shown in FIG. 3, the agent 336 performs IV checks on a number of device software components on an ongoing basis. This "integrity monitoring" is done to detect any unauthorized modification (e.g., tampering) such as the modification, replacement, removal, or additions of components or sub-components that are critical to supporting the security objectives for the system.

Such components monitored via IV by the agent 336 can include: ROM BIOS 331; HDD or device flash memory 328; stage 1 bootloader 334; stage 2 bootloader 335; Linux kernel 325 or portions of the Linux kernel; system call interface (I/F) 338; agent 336 including the secure store 327 (during both boot time and run time as indicated, respectfully, by dotted and solid arrows in FIG. 3); native application 320; Android™ OS 339; native Android™ application 321; JAC 324; Android™ (Dalvik) virtual machine 323; Android application 322; and application & system provisioning sequence (as further described with regard to FIGS. 4 and 5 below).

Such integrity monitoring (shown by solid arrows) of native application 1 320 is illustrated in FIG. 3. Here, the agent 336 continuously monitors native application 1 320 such that integrity is verified when the native application 1 320 attempts to access system resources through the system call I/F 338. This occurs through signature verification 337 whereby the agent 336 implements IV by comparing signature 1 340 to a known good value corresponding to application 1 resources. In particular, application 1 resources include IV information and the application signing certificate stored in a secure store 327. If the signature 1 value is the same as the stored application signing certificate (i.e., known good value), then the agent 336 assumes that the native application 1 320 has not been modified by an attacker and that its permissions or privileges 341 have not been modified. However, if the signature 1 value is different than the known good value, then the agent 336 assumes that the native application 1 320 has been modified and can no longer be trusted to perform the functionality that it was intended to perform. This process occurs for all native applications that may be present up to native application n 321.

Figure 4:
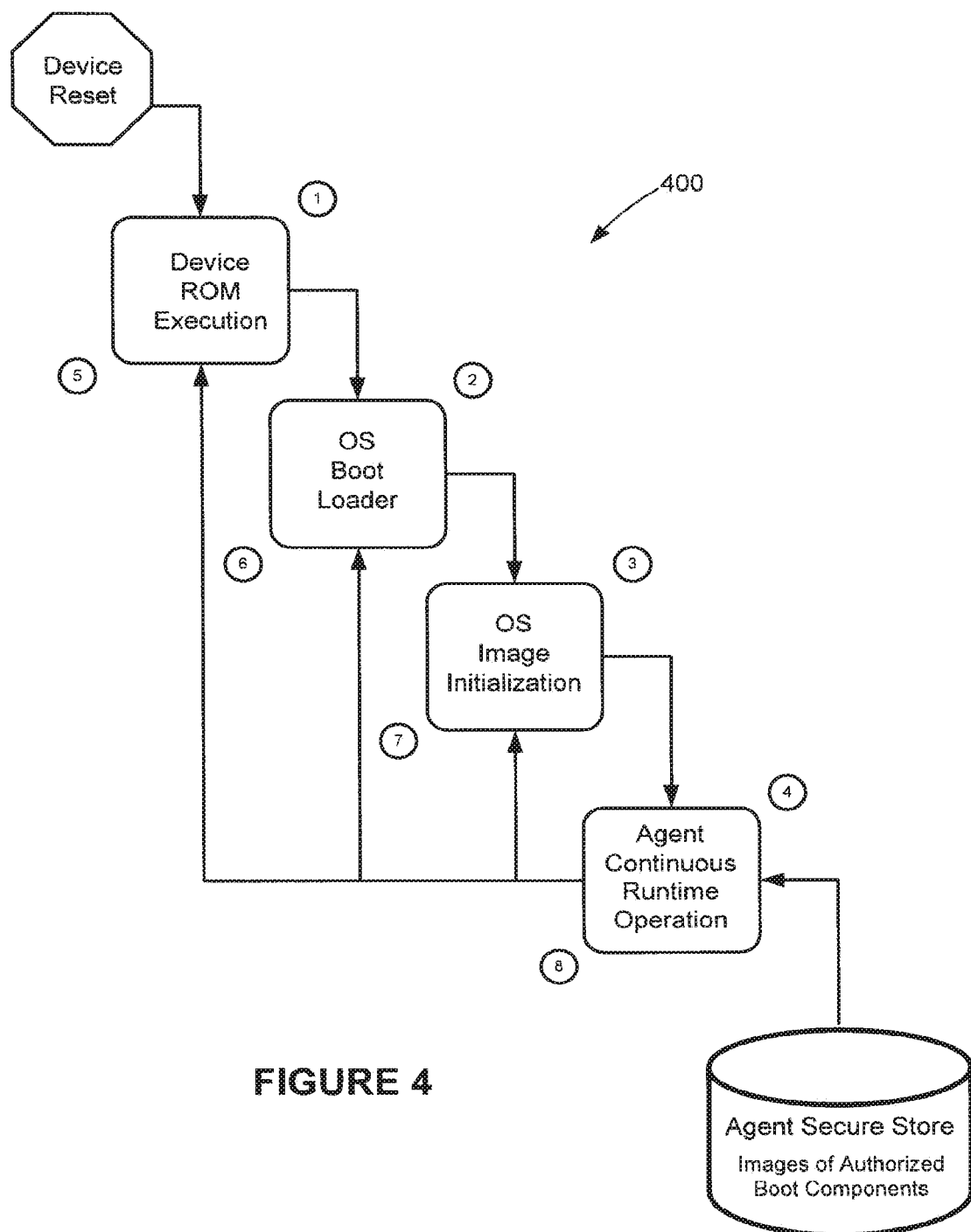
FIG. 4 is a schematic illustrating a typical boot loading sequence in accordance with the embodiment of FIG. 3.

The process isolation block 326 shown in FIG. 3 will be further explained with regard to FIG. 4 where there is illustrated a runtime boot loading sequence 400. In particular, upon device reset a top down validation (at steps 1, 2, and 3) of secure boot components can be seen. This validation serves to ensure that the OS that is loaded onto the device is the one intended by the OEM or operator and that the OS has the intended functionality. Once the agent 336 gains execution control during initialization (at step 4), the agent 336 will perform IV upon itself along with the previously executed components of the secure boot loader including the boot ROM image, the OS boot loader, and the OS image. If the integrity (from steps 1 through 4) of all of these components is confirmed by the agent 336 by using comparisons to data resident in the agent secure store 327 (at steps 5 though 8), then the agent 336 assumes that the OS that is installed on the device is the intended OS and that certain security functionality that may be performed by the OS has not been modified. However, if the agent 336 determines that one or more of the components cannot be authenticated, the agent 336 may take corrective action.

One possible corrective action taken by the agent 336 is to replace the boot components with a backup image of the intended boot components, then reset the device and start the boot up process again. If the agent 336 detects that the system is invalid after a number of attempts to correct invalid components, then the agent 336 can deny all further access to critical system resources or application resources. It should be readily apparent that the number of attempts is a matter of design choice using a predetermined variable. Likewise, the determination of which system resources can be considered critical can be predetermined based upon the given device usage. Other corrective actions can also be implemented by the agent 336.

Figure 5:
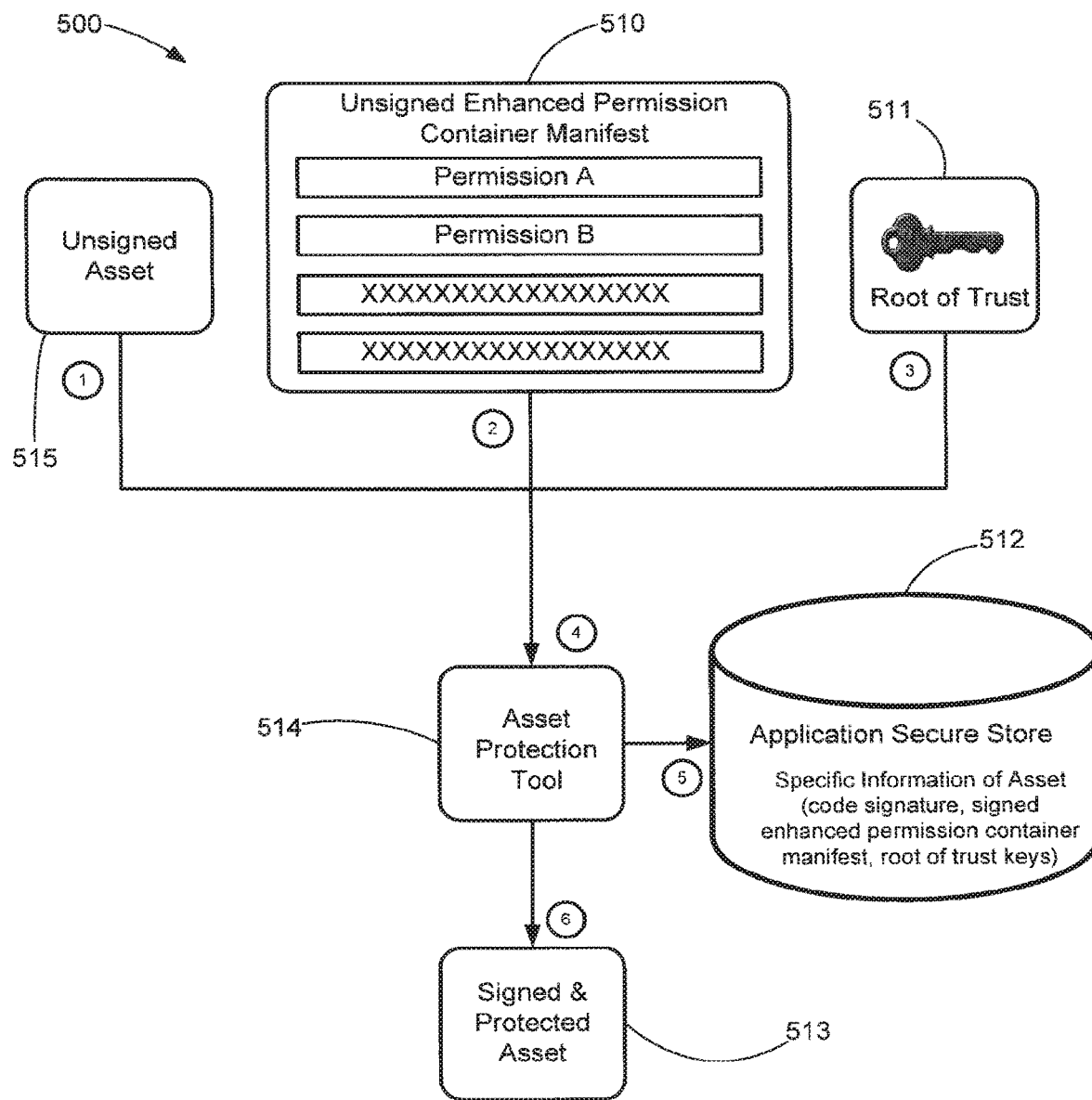
FIG. 5 is a schematic illustrating a provisioning sequence in accordance with the embodiment of FIG. 3.

It should be understood the preceding detailed description presumes that an application already exists and is therefore known to the OEM, operator, Internet-based retail interface provider, and, in turn, known to the agent 336. However, it is readily apparent that new applications can be developed and older applications can be updated. As such, FIG. 5 illustrates the processing that is applied to an application (unprotected) submitted by a developer during the application certification process 500. The agent can include an asset protection tool 514 that can be implemented as a software tool configured to create and update the encrypted application secure store 512. The asset protection tool 514 stores information to protect the unprotected application. It should be understood that a variety of tamper resistant techniques can be applied to the stored information such as, but not limited to, secure loader and IV, and the use of whitebox cryptography to protect cryptographic secrets at rest (e.g., on disk) and in use (e.g., in-memory).

With further regard to FIG. 5, there is provided an unprotected asset 515 (i.e., new application from a developer) at step 1. Created by the application developer or development system is an unsigned enhanced permission container manifest 510 at step 2. This lists the permissions (A, B, . . . etc.) granted to the application by the certifying authority. Moreover, the permissions are mapped to specific set of kernel system calls. After the unsigned manifest 510 is created, the asset protection tool 514 is configured to generate or use a provided private root of trust key 511 at step 3. The root of trust may be automatically and randomly generated by the asset protection tool. The asset protection tool 514 then signs the unsigned application 515 via the asset protection tool 514 at step 4 and places the result in a signed enhanced permission container manifest that exists within the application secure store 512. Moreover, the signed version of the enhanced permission container manifest is stored at step 5 in the application secure store 512 where information specific to the given asset (e.g., code signature, enhanced permission container manifest, root of trust keys) are placed. The resultant outcome at step 6 is a signed and protected asset 513 in the form of a fully provisioned application. Optionally, the unprotected new application may have a secure loader wrapped around it so as to provide a resulting protected asset with static tampering resistance and be IV enabled.

It should further be understood that not all application types may be provisioned for any particular embodiment of the asset protection tool discussed above. For example, in the embodiment related specifically to the Android™ OS, a typical list of application types that can be provisioned, installed, and subsequently run on the system implementing the present embodiment may be limited to a native OS application, a native Android application, and an Android™ application. Other open OS implementations may of course be possible beyond the specific Android™ OS implementation illustrated herein.

The permission information created in the provisioning sequence of FIG. 5 is further used by the agent 336 during installation onto the device and during runtime of the given application. Moreover, when the given application code selected from the types of available applications is provisioned the resulting signed enhanced permission container manifest in the application secure store contains all the permissions that the application code requires during runtime. The enhanced permission container manifest can specify the application code signature and the signature of the container itself to prevent tampering of the container or application after the application code has been signed.

Figure 6:
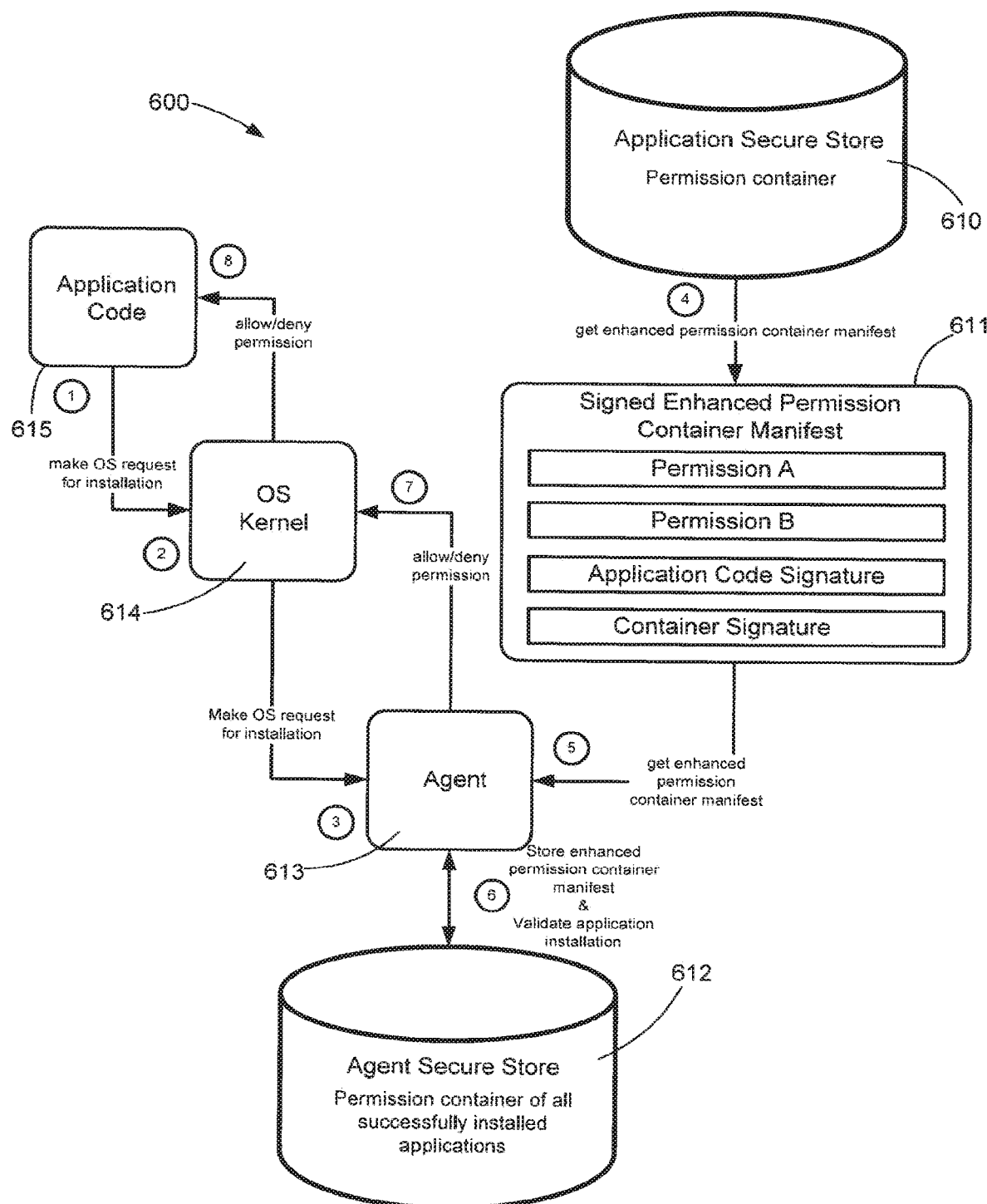
FIG. 6 is a schematic illustrating an installation of application permissions in accordance with the embodiment of FIG. 3.

With regard to FIG. 6, initial installation 600 of application permissions is illustrated. The signed enhanced permission container manifest 611 is found within the application secure store 610 that was created during provisioning time in FIG. 5. As previously mentioned, the enhanced permission container manifest 611 is encrypted by the asset protection tool 514. Accordingly, this facilitates transfer of the enhanced permission container manifest 611 from the application secure store 610 to the agent secure store 612. Both the application secure store 610 and the agent secure store 612 comprise the secure store as generally shown in FIG. 3.

Within the enhanced permission container manifest 611 there exists a permission list (i.e., Permission A, Permission B, . . . etc.). The permission list determines what OS kernel resources can be accessed by the given application code that forms the application being installed and run. The application code signature is used by the agent 613 to perform IV on the application to ensure it has not been modified at the time it makes the OS request for particular kernel permissions, such as "install" requests. The container signature is a reference value for the container itself, and is used by the agent 613 to ensure the contents of the container have not changed. Once the integrity of the OS and the application have been verified, the installed application's enhanced permission container manifest will be stored in the agent secure store 612 for future reference of other permission requests for that application.

With further regard to FIG. 6, the installation sequence includes first sending at step 1 a request to the OS kernel 614 to install an application pursuant to an installer directive from the application code 615. Subsequently, the OS kernel 614 passes along the request to the agent 613 at step 2. The agent 613 validates (via IV as already described above) the OS kernel 614 at step 3. It should be understood as previously noted above, that the agent 613 also validates the OS kernel 614 in an ongoing manner (i.e., as a background process). At step 4, the agent 613 accesses the application secure store 610 to retrieve the signed enhanced permission container manifest 611 therefrom. The agent 613 validates at step 5 the application's signed enhanced permission container manifest through IV using the signed enhanced permission container manifest 611. The agent 613 at step 6 stores the validated application's enhanced permission container manifest into the agent secure store 612 for future reference. Based upon the step 5 validation operation, the agent 613 allows or denies the install to the OS kernel 614 at step 7. In turn, the OS Kernel 614 at step 8 passes the permission (allow or deny) to the installer directive that is installing the application to be installed to ultimately allow or deny installation of the application code 615.

Figure 7:
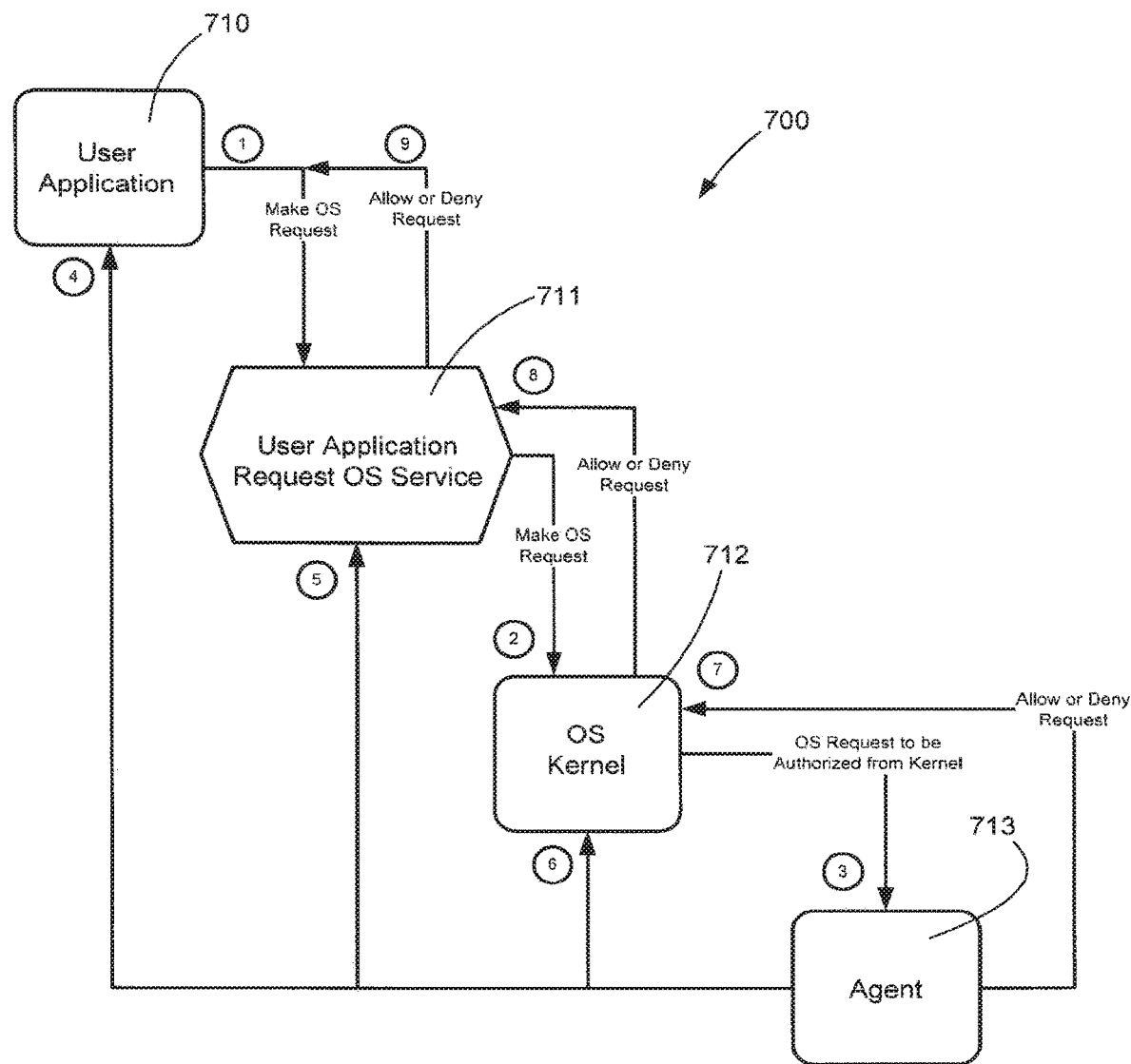
FIG. 7 is a schematic illustrating continuous system integrity during runtime in accordance with the embodiment of FIG. 3.

As mentioned above, the agent validates the OS kernel in an ongoing manner as kernel operations are required. This kernel access control 700 is shown in FIG. 7 in terms of continuous runtime system integrity. The sequence of how the entire system integrity is maintained whenever any application makes an OS request for kernel services. In FIG. 7, an installed and running application (i.e., user application)

710 is shown making a request for OS services or resources 711. This request is passed to the OS kernel 712 and which request is, in turn, passed along to the agent 713 via the LSM functionality that will ultimately allow or deny the request. The criteria used by the agent 713 to allow or deny the application request may include: system/application integrity, application permissions, application behavior, security context for other applications that may be running, and remote commands (element 216, shown previously in regard to FIG. 2A).

The agent decision criteria related to system/application integrity includes whether tampering has been detected to either system or application components.

The agent decision criteria related to application permissions includes whether the application has the necessary permissions to make such a request. In the Android™ OS, such permissions are declared in a manifest file that is associated with the application. Application developers must declare these permissions and it is up to the consumer to grant or not grant these permissions which may be problematic as consumers are not typically aware of security implications of their actions.

The agent decision criteria related to application's behavior disregards whether an application may have permissions to access certain kernel services and instead relies upon the application's behavior. For example, an application that requests consumer GPS coordinates every 15 seconds and then attempts to send such coordinates to a third party via some messaging protocol such as SMS, could potentially be "spyware." Such behavior therefore may result in request denial even though the application may have permissions associated with the kernel service related to GPS coordinates (i.e., the agent would block access if the application had rights granted to location data, but not rights granted to SMS data).

The agent decision criteria related to the security context of any other applications that may be running also disregards whether an application may have permission to access certain kernel services and instead looks to whether allowing a request when another trusted application is running could negatively affect one or more of these trusted applications. In other words, the agent properly enforces permissions at run time. For example, the requesting application may try to access certain memory or drivers to capture high definition video after a trusted high definition video player application that implements digital rights management has decrypted the video thereby calling into question the appropriateness of the high definition video data usage by the requesting application (i.e., the agent may block access to the screen buffer memory, though allow the playing of the video itself).

The agent decision criteria related to remote commands involve providing the agent the ability to support commands from a remote entity (e.g., a service provider) that could override the applications permissions or privileges. For example, a mobile operator may wish to disable a mobile device that has been stolen. In this case, the agent would also base decisions to provide system access on remote commands that would prevent the device from being used by an unauthorized user of the device. For example, a mobile operator may wish to disable or limit, the access an application or applications have to network services or other kernel resources in the event that such an application is causing problems with network reliability or stability (e.g., by generating a high volume of traffic or connections that cannot be sustained by the network). In this case, the agent could override the privileges that the application has or prevent the application from executing at all.

Further, such commands from the remote command controller may be used to limit permissions (e.g., reduce privileges, change privileges, or revoke privileges). Further, such commands from the remote command controller may be used to remove applications from the device, including terminating the application if currently executing, removing the application from memory, or un-installing the application completely. Overall, it is important to note that the described embodiment may not only serve to "kill" applications, but may also serve to limit access to system resources beyond the access that is implied in the privileges associated with the given application—e.g., even if an application has the privilege to send SMS messages, this is not quantified in the privileges such that when the application sends, for example, 10,000 SMS messages an hour, the agent could "throttle this back" based on some "normal behavior" template stored in the agent secure store or based on remote commands. Still further, the agent may be used to report anomalous behavior back to the remote entity so that, for example, a mobile operator or designated third party could make decisions about what to do (e.g., an application has made X requests for a system resource over some period of time).

Using the aforementioned criteria for ongoing runtime system integrity, the kernel access control 700 shown in FIG. 7 includes an initial OS request by the user application 710 at step 1. In turn, the application at step 2 creates a software interrupt or otherwise creates an event for the OS. In the OS kernel 712, the LSM receives the request 711 (i.e., interrupt/event) and passes the request 711 to the agent 713 at step 3. The agent 713 integrity verifies the application 710 and the permissions at step 4 using the criteria described above. At step 5, the agent 713 ventilates the user request memory stack. Thereafter, the agent 713 integrity verifies the OS kernel image in memory at step 6. As previously mentioned, IV checks are run on an ongoing basis by the agent 713. This check verifies that the IV process is still running and has not detected any evidence of tampering. Based upon the system validation process (steps 4, 5, and 6), the agent 713 therefore allows or denies the request, and, at step 7, the allowance or denial of the request is passed along to the OS kernel 712. In turn, the OS kernel 712 passes along the allowance or denial of the request at step 8. At such point, the application event returns control back to the application 710 at step 9 with the decision to allow or deny the request.

Figure 8:
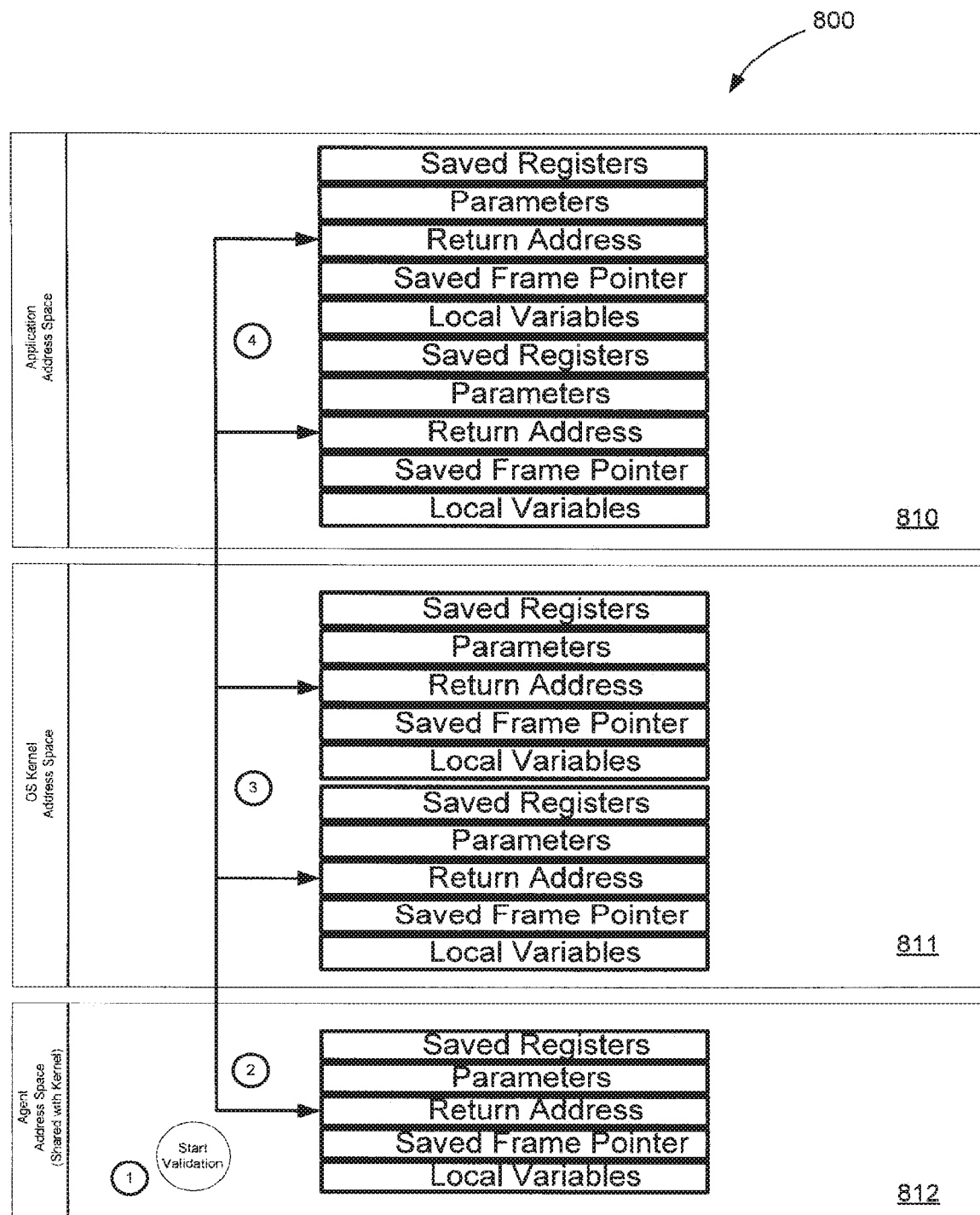
FIG. 8 is a schematic illustrating validation of a user application request during runtime in accordance with the embodiment of FIG. 3.

As in the continuous runtime system integrity of FIG. 7, it should be understood that the application can also be validated in an ongoing manner. Accordingly, there is shown runtime validation of an application request in FIG. 8. In general, an application must not be tampered with in any way or validation here will fail. The stack diagram 800 in FIG. 8 illustrates how the some embodiments can efficiently provides application integrity monitoring while maintaining system integrity at the same time. The address spaces for the agent 812. OS kernel 811, and application 810 are shown. As the agent is embedded in the OS kernel, it should be understood that the agent address space 812 is therefore shared with the OS kernel address space 811. Return addresses in the calling stack are data points into integrity verification information that is contained in the agent. The start of runtime validation (at step 1) of the application involves the agent walking the stack of the request for OS service while validating all return addresses (at steps 2 through 4) and performing integrity verification on the address range utilizing the call stack signature as described below. When an application makes a request for any OS kernel service, the OS kernel passes along this request of a kernel service to the agent. This OS kernel is LSM enabled such that the agent is required to allow or deny the request.

The runtime call stack signature calculation can be accomplished using the distance (in bytes) between each return address on the stack to the top of the stack. Table A represents example call stacks for the agent 812, the OS kernel 811, and the application 810.

TABLE A

| Call Stack Signature | Owner | Stack Frame Element Filter "Return Address" | Comments |
| --- | --- | --- | --- |
|  | Agent | Return Address | Current Stack Position (must be Agent Address Space) |
| 12 bytes | Agent | ... | Variable length stack frame |
|  | Agent | Return Address | Calculate the bytes inbetween |
| 23 bytes | OS Kernel | ... | Variable length stack frame |
|  | OS Kernel | Return Address | Calculate the bytes inbetween |
| 44 bytes | OS Kernel | ... | Variable length stack frame |
|  | OS Kernel | Return Address | Calculate the bytes inbetween |
| 10 Bytes | User App | ... | Variable length stack frame |
|  | User App | Return Address | Calculates the bytes inbetween |
|  | User App |  | Top of Stack |

The signature from the above example includes an application unique user ID randomly assigned during installation and a collection of call stack signature bytes as seen in Table B.

TABLE B

| Application Identifier (2-8 bytes) | Call Stack Signature (2-128 bytes) |
| --- | --- |

In terms of the example of TABLE B, the signature of call stack of "Application ID 12032" would be "12032:12:23:44:10" and used in the integrity verification check by the agent.

The depth of the stack can have a variable length but in the example, does not to exceed 128 samples. Also, the depth of the stack between the OS kernel and the agent is known and calculated prior to the application calling the OS kernel services. From this calculation, the agent may determine that all the return addresses on the call stack are included in the integrity verification signature range when the application and system components were provisioned. It should be understood that all the return addresses can be found in the list of signatures of the signed application and system components, which are stored in the agent secure store, in order for the agent to allow the OS to service the application.

As shown in FIG. 8, there is detailed a runtime call stack signature validation sequence. The validation sequence begins at step 1. Thereafter, at step 2, the agent examines the stack and determines the return address which identifies the location of the calling code in the OS Kernel address space 811. Based on the calling code, the agent at step 3 verifies that the caller is legitimate and has recently and successfully had its integrity verified. There may be several layers of this checking in the OS Kernel address space 811, as indicated in FIG. 8. Thereafter, at step 4, a similar return address determination and validation process is performed as calling code in the stack appears from the application address space 810. Again, there may be several layers of this checking in the application address space 810, as shown in FIG. 8.

Figure 9:
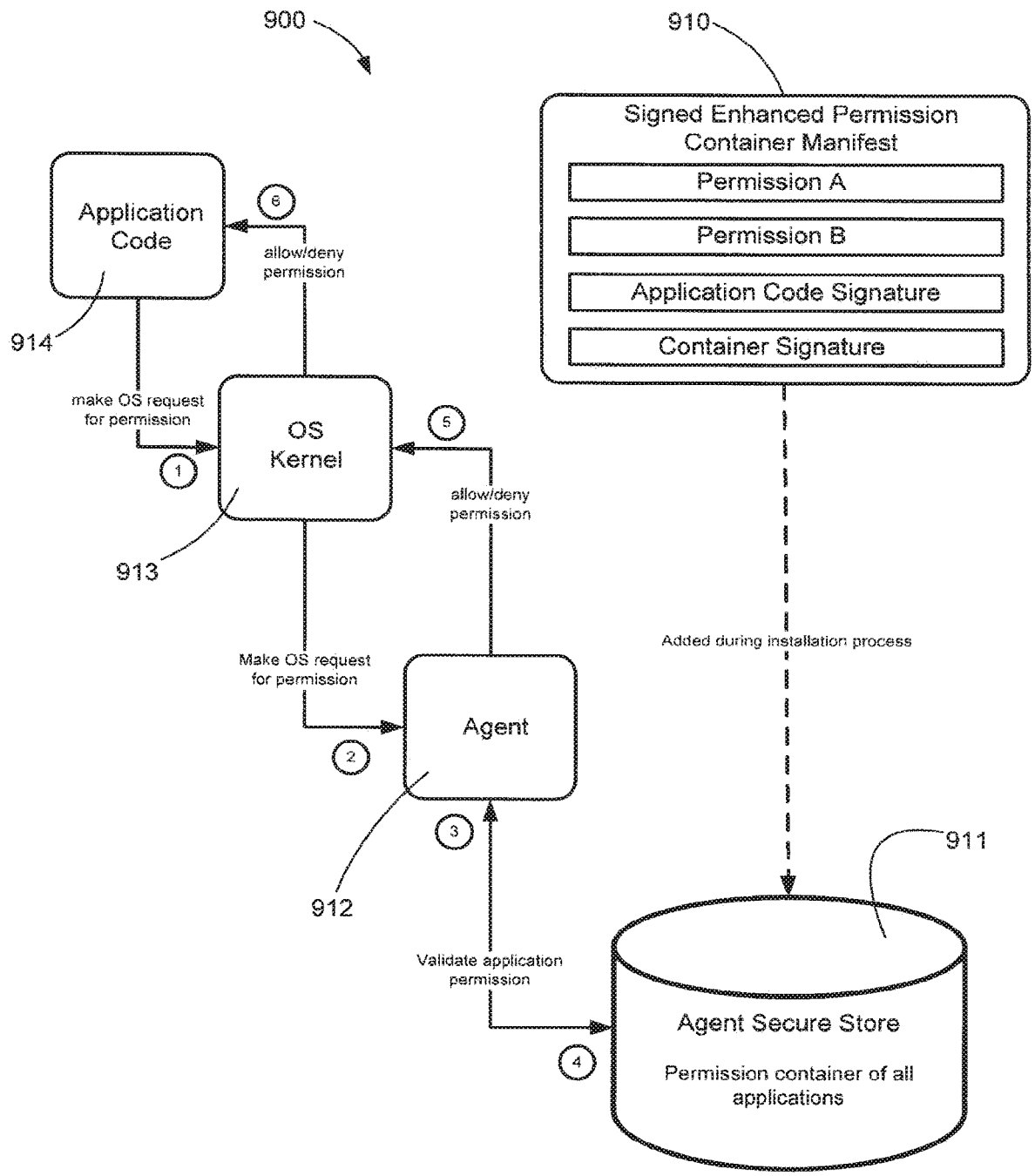
FIG. 9 is schematic illustrating application permission enforcement during runtime in accordance with the embodiment of FIG. 3.

During runtime, it should be understood that application permissions should be enforced on an ongoing basis as applications are subject to dynamic attacks (e.g. portions of an application or its associated permissions could be modified during execution using a debugger). Such application permission enforcement 900 is shown in FIG. 9. Here, any request that an application 914 makes to the OS kernel 913 after installation of the application 914 will be validated using the signed enhanced permission container manifest 910 that is stored in the agent secure store 911. The agent 912 will allow or deny the request based on the integrity of the system and the permission provided in the enhanced permission container 910. The enforcement sequence includes an application 914 making an OS request at step 1 and, at step 2, the OS kernel 913 validates the request with the agent 912. At step 3, the agent 912 validates the OS integrity as already described above.

Step 4 provides that the agent 912 validates the type of OS Kernel request from the signed enhanced permission container manifest 910. It is important here to note that, at run-time, the requesting application is only granted access to OS Kernel services, that are contained within the signed enhanced permission container manifest 910 which contains the requested permissions as identified by the application developer prior to submission of the application to certification. Moreover, this mechanism maintains the security and integrity of the system, even if the application developer does not correctly identify all kernel services that their application attempts to access at run time.

Once the agent 912 validates the type of OS Kernel request from the signed enhanced permission container manifest 910, the agent 912 then passes the allow or deny decision based on the validation in the steps 3 and 4 to the OS kernel 913 at step 5. Subsequently, the OS kernel 913 passes such allow or deny decision to the application 914 at step 6 based on the agent decision passed to it.

Loadable Kernel Modules

A common attack vector used by malware, including rootkits, is to install loadable kernel modules to execute the malicious payload and probe the system for further vulnerabilities. Loanable kernel modules contains code that is used to extend the running OS kernel to add functionality or support for new hardware, file systems or for adding system calls. Dynamically loading kernel module code as it is needed is attractive as it keeps the OS kernel size to a minimum and makes the OS kernel very flexible. In addition to loading kernel modules on-demand when needed by the OS kernel, kernel modules can be loaded manually by using, for example, the insmod utility in a Linux-based OS such as Android.

Malware can take advantage of a vulnerability in the operating system that can allow a kernel module to be installed into the OS kernel. For example, the Mindtrick Android rootkit leverages loadable kernel modules to install kernel level components, and then accesses low level facilities of the OS kernel, such as SQLite, to access private data such as call records and SMS/MMS messages.

Figure 10:
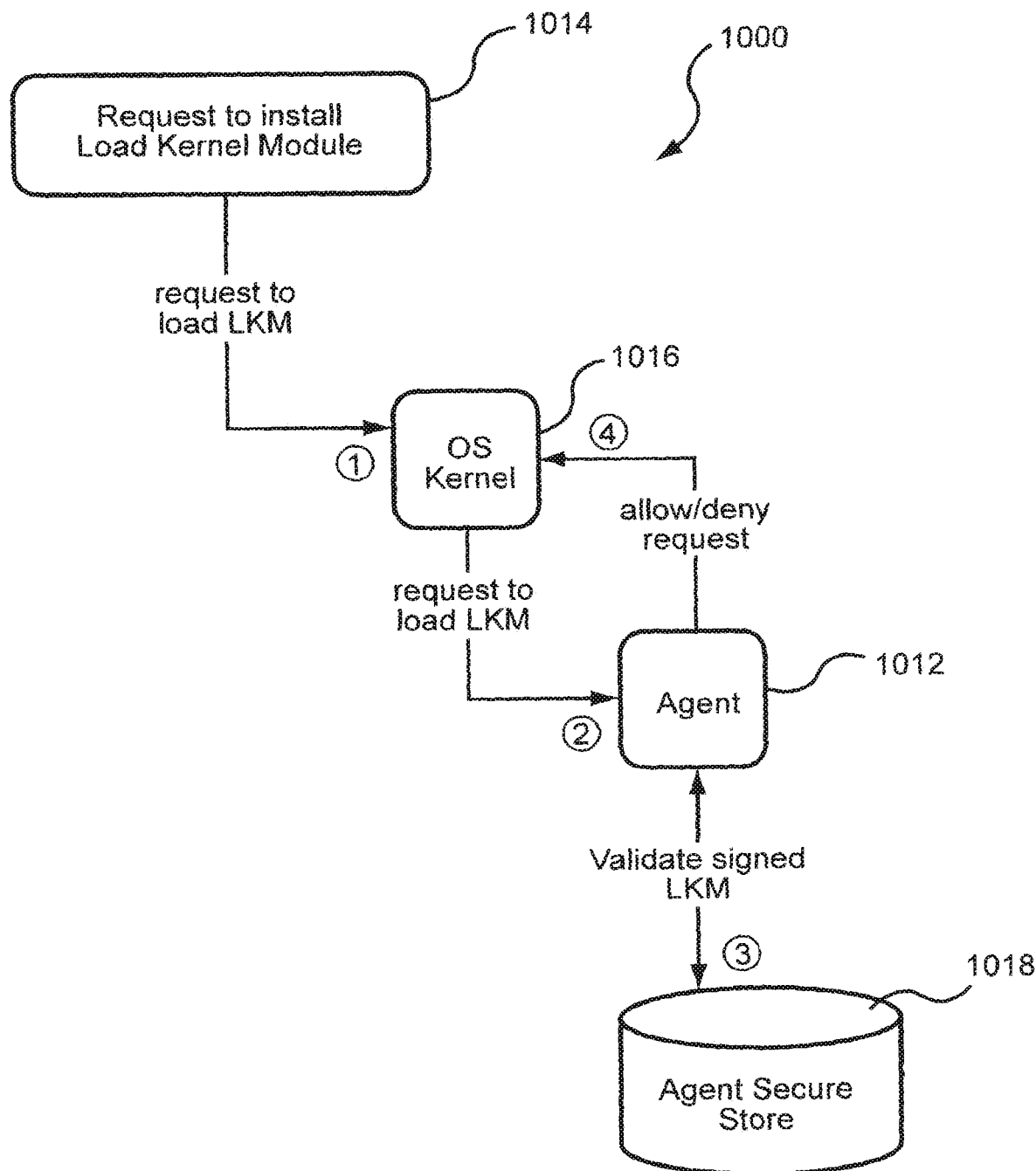
FIG. 10 is a schematic illustrating a loadable kernel module enforcement process in accordance with the embodiment of FIG. 3.

Referring to FIG. 10, a loadable kernel module enforcement process 1000 is illustrated where the agent 1012 determines whether to install a loadable kernel module. A request 1014 to install a loadable kernel module is made to the OS kernel 1016 in step 1. The request 1014 can be a dynamically generated request or a manual request (e.g. via insmod), and can be generated from either the OS kernel layer or the application layer. Next, at step 2, the request to the OS kernel 1016 calls the agent 1012 via the LSM functionality to validate the request to load the loadable kernel module (e.g. via hooks in the code of the OS kernel 1016 that installs a loadable kernel module, such as insmod).

The agent 1012 validates the request based on a number of factors. For example, the agent 1012 can deny any request from the application level (e.g. user mode process) or that was generated manually (e.g. via insmod utility). Validation performed by the agent 1012 can further include validation of the loadable kernel module code object itself. Validation can further include verification that the loadable kernel module is certified and/or signed by an authority, such as, for example, via the process described with respect to FIG. 5. For example, the agent 1012 can perform integrity verification on the loadable kernel module to determine that the loadable kernel module is properly signed by the appropriate authority and that the loadable kernel module has not been modified. This validation can be performed against information stored in the agent secure store 1018 in step 3. Finally, in step 4, the agent 1012 passes the allow or deny decision based on the validation decision to the OS kernel 1016. The OS kernel 1016 will then install the loadable kernel module based on the decision received from the agent 1012. By using the above process, the agent 1012 can prevent rootkit attacks that attempt to install its payload using a loadable kernel module.

System Call Table

Another attack vector used by malware is the system call table. The system call table is a table of pointers to functions that are used to request a service from the operating system. When a system call is issued, the application is interrupted and control is given to the OS kernel to execute the function in kernel mode. Malware, such as rootkits, frequently attack the system call table by overwriting entries to re-direct system calls made by the OS kernel to the malicious payload code of the malware that can then execute in kernel mode.

The OS kernel stores the system call table under a structure called sys_call_table in Linux and Android. Modern Linux kernels no longer allow the sys_call_table to be exported and it can only be accessed through a loadable kernel module that has access to kernel memory. Linux kernels also typically write protect the sys_call_table so that the memory page containing the sys_call_table is read-only. But, this approach does not protect against a compromised kernel mode process or writing the sys_call_table during initiation of the OS Kernel. A few system calls are exported, such as sys_read( ) and sys_write( ), and are available to loadable kernel modules. The aforementioned Mindtrick Android rootkit used a loadable kernel module to intercept system calls to some of these exported system calls to discover and intercept higher layer functions of the OS Kernel of the Android device.

Figure 11:
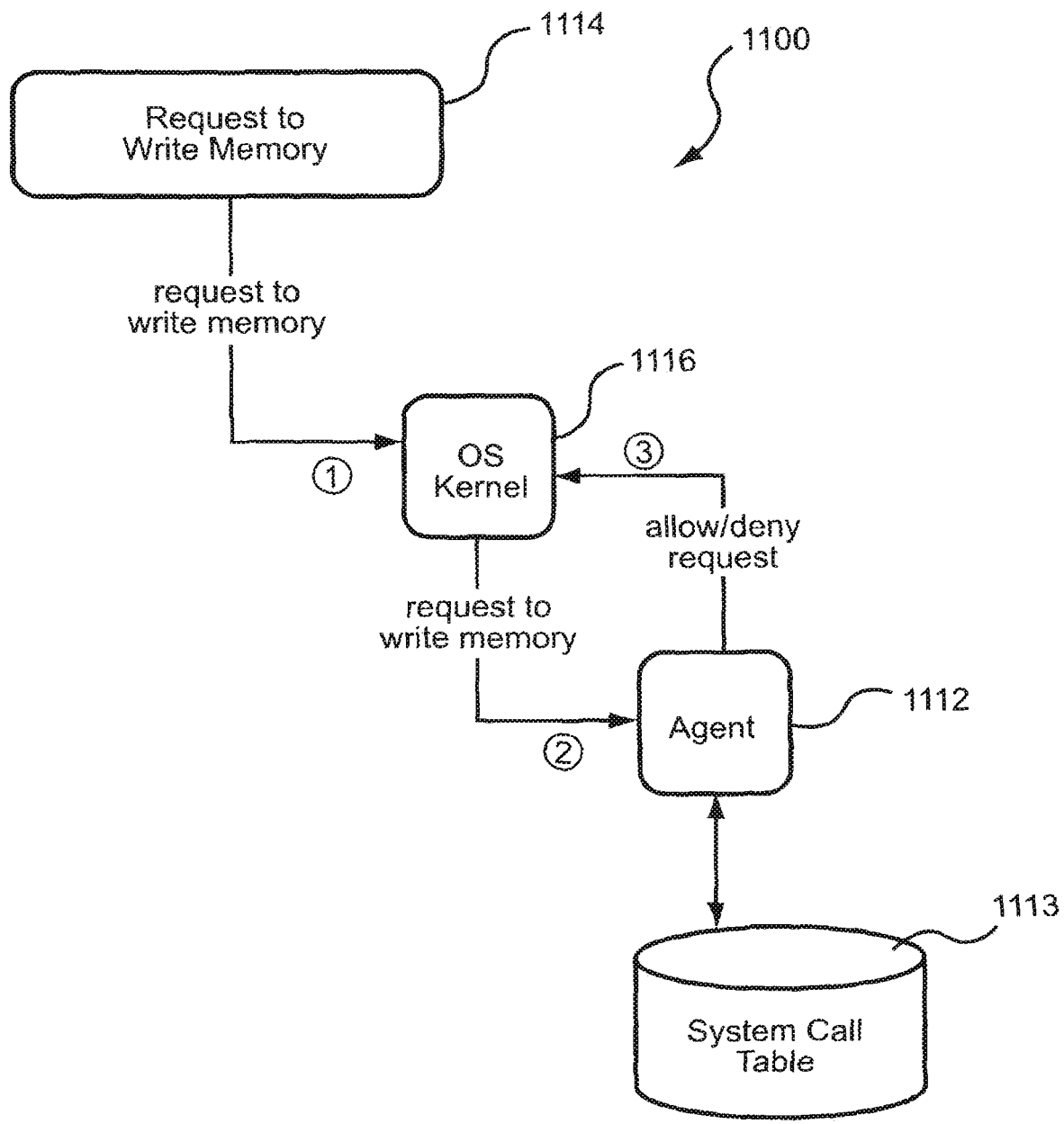
FIG. 11 is a schematic illustrating a system call table protection process in accordance with the embodiment of FIG. 3

Referring to FIG. 11, a system call table protection process 1100 is illustrated where the agent 1112 blocks attempts to over-write the system call table 1113. The sequence of how the system call table integrity is protected is shown with respect to a request 1114 to write to memory. The request 1114 can a be a request to write to system memory, such as a sys_write( )request to the OS kernel 1116, for example, and can be initiated from a user-mode or kernel-mode process or application. This request 1114 is passed to the OS kernel 1116 in step 1. The request is then passed along to the agent 1112 via the LSM functionality in step 2. The agent 1112 will then either allow or deny the request 1114 and return control to the OS kernel 1116 in step 3.

Typically, user-mode processes will be restricted from writing to system memory in the OS kernel address space. The agent 1112 can further enforce this by evaluating whether the calling process or application is a user-mode or kernel mode process. If an attacker is able to install their own loadable kernel module into the OS kernel 1116 then the malicious loadable kernel module can attempt to overwrite the system call table. This is how the Mindtrick rootkit accesses the system call table. The agent 1112 can determine if the request to write memory is within the range of the address space of the system call table 1113.

The agent 1112 can perform bounds checking on, the memory write request to determine whether the write request 1114 is an attempt to overwrite the memory range of the system call table 1113. In some embodiments, the agent 1112 can be implemented as, additional code that is hooked into the sys_write( ) system call to block writing to the sys_call_table. This process provides added protection above performing integrity verification on the system call table and the system call interrupt handler code that may be more difficult to protect dynamically during runtime.

Anti-Debug

Debugging tools are also commonly used as an attack vector and can also be used to discover vulnerabilities in the OS Kernel or other applications executing on the device. OS kernels typically include a system call to trace the operation of another process, such as ptrace, for example, which is used in Unix based operating systems including Linux and Android. Using ptrace, or similar process tracing utilities, can allow a parent process to observe and control the execution of a target process. Control over the target process can include manipulation of its file descriptors, memory, and registers, as well as manipulation of the target process's signal handlers to receive and send signal. The ability to write to the target process's memory allows ptrace to alter the target process's code to install breakpoints or otherwise alter the running code. Ptrace is used by debuggers, and other tracing tools, such as strace and ltrace that monitor system and library calls, respectively. The inter-process spying provided by ptrace and debuggers can be used to develop and execute rootkit malware attacks.

Android provides a debug bridge as part of the Android software development kit that allows a developer to communicate with and control an Android device over a serial connection (e.g. USB) to test their development software code. The Android device runs a daemon, referred to as the Android Debug Bridge daemon or ADBd, to which a client connects in order to control the device. The ADBd process is often exploited by malware attacks to provide root privileges or kernel mode operation on the device. For example, the RageAgainstTheCage rootkit exploits ADBd through a resource exhaustion attack that causes ADBd to fail and remain operating as root. When ADBd runs as the root user, the shell provided to the client will also run as the root user.

Figure 12:
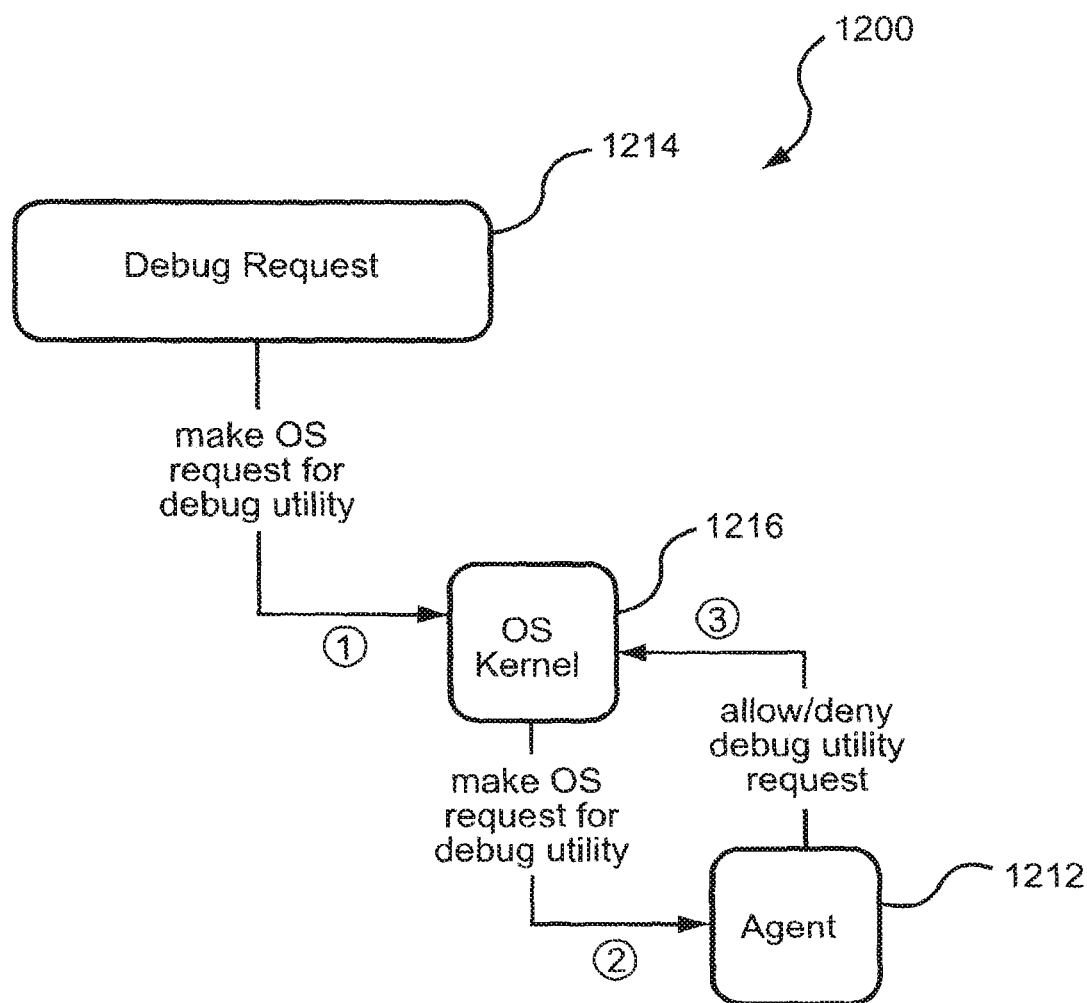
FIG. 12 is a schematic illustrating a debug blocking process in accordance with the embodiment of FIG. 3

Referring to FIG. 12, a debug utility blocking process 1200 is illustrated where the agent 1212 blocks attempts to access debug utilities. The sequence of how the debug blocking process operates is shown with respect to a debug request 1214. The debug request 1214 can be a system call to a process tracing utility or request made to a debugging utility. For example, the debug request can include a system call to a utility to facilitate debugging, such as ptrace, for example. Another example can include a request to a debug utility, such as a debug daemon running as part of the OS kernel (e.g. ADBd). The debug request 1214 is passed to the OS kernel 1216 in step 1. The request is then passed along to the agent 1212 via the LSM functionality in step 2. The agent 1212 will then either allow or deny the debug request 1214 and return control to the OS kernel 1216 in step 3.

The agent 1212 can evaluate whether the parent process has the appropriate privileges to allow the debug utility to attach to the target process. For example, a process associated with one user ID may not be allowed to attach the debug utility to a process of another user ID or group ID to which the first user ID does not belong. The agent 1212 can further limit the attaching of the debug utility based on whether the target process is certified or signed (e.g. an integrity verified process) or an OS kernel 1216 process/component. Blocking or preventing a debug utility from attaching to certified applications and the OS kernel can prevent a malicious attacker from discovering vulnerabilities in this software code and prevent exploiting vulnerabilities that can exist, in the debug utility. Blocking access to these processes can be performed without inhibiting development of non-malicious software.

The above-described embodiments are intended to be examples only. Alterations, modifications and variations may be effected to the particular embodiments by those of skill in the art without departing from the scope of the invention, which is defined solely by the claims appended hereto.

The invention claimed is:

1. A method for preventing security threats on a device, the device having a boot ROM, the boot ROM containing executable code, the method comprising:
receiving an operating system bootloader component;
verifying, by executing at least a portion of the executable code, the integrity of the operating system bootloader component by obtaining a first computed digital signature of the operating system bootloader component and determining that the first computed digital signature corresponds to a digital signature contained within a certificate of the operating system bootloader component;
loading the operating system bootloader component in a memory of the device;
executing the operating system bootloader component to thereby:
(i) securely load into a memory of the device an operating system image, the operating system image including an operating system (OS) kernel, and
(ii) transfer execution control to the operating system;
initializing the operating system image wherein the initializing includes starting the OS kernel contained in the operating system image; and
starting a secured software agent embedded in the OS kernel and implemented using a Linux Security Module (LSM) interface, the secured software agent configured to:
(i) insert one or more upcalls to the secured software agent at points in the OS kernel where a system call from an application running in the operating system or the OS kernel itself would result in access to an internal OS kernel object;
(ii) receive, from the OS kernel via at least one of the one or more upcalls, a request to install a loadable kernel module into the OS kernel;
(iii) perform a validation to determine that the loadable kernel module has not been modified, wherein the validation is performed against information stored in a secure store; and
(iv) install the loadable kernel module into the OS kernel.

2. The method of claim 1 wherein the secured software agent has sole access to the secure store.

3. The method of claim 1 wherein the secured software agent validates the loadable kernel module by performing integrity verification process including computing a hash value for the loadable kernel module and comparing the hash value to a known good value.

4. The method of claim 1 wherein the secured software agent is further configured to perform a check that the request to install the loadable kernel module is a valid request.

5. The method of claim 4 wherein the secured software agent is further configured to pass the result of performing the check that the request to install the loadable kernel module is a valid request to the OS kernel.

6. The method of claim 1 wherein elements (i) through (iii) are performed dynamically.

7. The method of claim 1 wherein the request to install a loadable kernel module is performed dynamically.

8. The method of claim 1 wherein the request to install a loadable kernel module comes from the insmod utility of the OS kernel.

* * * * *